United States Patent
Su et al.

(10) Patent No.: US 11,997,179 B2
(45) Date of Patent: *May 28, 2024

(54) DISTRIBUTED PROXY FOR ENCRYPTED TRANSPORT PROTOCOLS WITH EFFICIENT MULTI-PRIORITY MULTIPLEXED TRANSPORT FOR IMPROVING USER'S TRAFFIC QOS

(71) Applicant: Hughes Network Systems, LLC, Germantown, MD (US)

(72) Inventors: Chi-Jiun Su, Rockville, MD (US); John Leonard Border, Middletown, MD (US); Robert James Torres, New Market, MD (US); Bhavit Jogeshkumar Shah, Gaithersburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,369

(22) Filed: Feb. 13, 2023

(65) Prior Publication Data
US 2023/0379398 A1     Nov. 23, 2023

Related U.S. Application Data

(63) Continuation of application No. 17/900,673, filed on Aug. 31, 2022.
(Continued)

(51) Int. Cl.
*H04L 12/00* (2006.01)
*H04L 47/11* (2022.01)
(Continued)

(52) U.S. Cl.
CPC ............ *H04L 67/56* (2022.05); *H04L 47/115* (2013.01); *H04L 67/141* (2013.01);
(Continued)

(58) Field of Classification Search
CPC ..... H04L 67/56; H04L 47/115; H04L 67/141; H04L 69/163; H04L 69/164
(Continued)

(56) References Cited

U.S. PATENT DOCUMENTS 7,548,532 B2 *  6/2009  Krischer ............... H04L 65/764
                                                    370/392
9,531,689 B1 * 12/2016  Romero-Mariona .......................
                                                    H04L 63/0428
(Continued)

OTHER PUBLICATIONS

International Search Report and Written Opinion dated Sep. 25, 2023 in related PCT/US23/22697, filed May 18, 2023—20 pages.
(Continued)

*Primary Examiner* — Frantz Coby
(74) *Attorney, Agent, or Firm* — NovoTechIP International PLLC

(57) ABSTRACT

An Encrypted Transport (ET) proxy module is configured to receive incoming ET proxy packets from an ET proxy backbone module and transmit outgoing ET proxy packets to the ET proxy backbone module. The ET proxy module is also configured to set up an HTTP tunnel with an ET proxy client of the client device or with an ET proxy at a web server for receiving incoming UDP payloads from the client device or web server and transmitting outgoing UDP payloads to the client device or web server. The ET proxy module is also configured to receive prioritization preferences from client devices or web servers pertaining to the UDP payloads indicating preferred quality-of-service (QoS) classes for the UDP payloads, and to schedule transmission (Continued)

of the outgoing UDP payloads via the HTTP tunnel based on QoS classes of the outgoing UPD payloads.

20 Claims, 23 Drawing Sheets

Related U.S. Application Data

(60) Provisional application No. 63/343,927, filed on May 19, 2022.

(51) Int. Cl.
| | |
|---|---|
| *H04L 67/141* | (2022.01) |
| *H04L 67/56* | (2022.01) |
| *H04L 69/163* | (2022.01) |
| *H04L 69/164* | (2022.01) |
| *H04L 69/22* | (2022.01) |

(52) U.S. Cl.
CPC .......... *H04L 69/163* (2013.01); *H04L 69/164* (2013.01); *H04L 69/22* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 11,522,838 | B2* | 12/2022 | Boynton | ............. H04L 63/0464 |
| 2013/0019094 | A1* | 1/2013 | Garcia | ................. H04L 63/0478 |
| | | | | 713/160 |
| 2014/0331054 | A1* | 11/2014 | Hanumantharayappa | ................... |
| | | | | H04L 63/0428 |
| | | | | 713/176 |
| 2017/0237720 | A1* | 8/2017 | Sturniolo | ............. H04L 63/0281 |
| | | | | 713/154 |
| 2022/0407689 | A1* | 12/2022 | Jeuk | ...................... H04L 9/0861 |
| 2023/0095749 | A1* | 3/2023 | Heinrich | ................. H01L 24/83 |
| | | | | 257/746 |

OTHER PUBLICATIONS

Mike Kosek et al: "Exploring Proxying QUIC and HTTP/3 for Satellite Communication" Arxiv.org, Cornell University Library, 201 Olin Library Cornell University Ithaca, NY 14853, May 3, 2022 (9 pages).

Ames Pavur et al: "QPEP: A QUIC-Based Approach to Encrypted Performance Enhancing Proxies for High-Latency Satellite Broadband" , Arxiv.org, Cornell University Library, 201 Olin Library Cornell University Ithaca, NY 14853, Feb. 12, 2020, pp. 1-15.

Jones G Fairhurst University of Aberdeen N Kuhn Cnes J Border Hughes Network Systems T et al: "Enhancing Transport Protocols over Satellite Networks," No. 2, Oct. 25, 2021, pp. 1-29.

Yengar Jet Al: "QUIC: A UDP-Based Multiplexed and Secure Transport," QUIC, Internet Engineering Task Force, IETF; Standard Working Draft, Internet Society (ISOC) 4, No. 34, Jan. 15, 2021, pp. 1-207.

"3rd Generation Partnership Project; Technical Specification Group Core Network and Terminals; Study on IETF QUIC Transport for 5GC Service Based Interfaces; (Release 16)", 3GPP Standard; Technical Report; 3GPP TR 29.893, 3rd Generation Partnership Project (3GPP), Mobile Competence Centre; 650, Route Des Lucioles; F-06921 Sophia-Antipolis Cedex; France, No. VI.6.0 25, Nov. 2020, pp. 1-39.

Li K Zheng R Jadhav J Kang Huawei T: "Optimizing ACK mechanism for QUIC draft-li-quic-optimizing-ack-in-wlan-02; draft-li-quic-optimizing-ack-in-wlan-02.tx t", Optimizing Ack Mechanism for QUIC Draft-Li-QUIC-Optimizing-Ack-In-WLAN-02; Draft-Li-QUIC-Optimizing-Ack-In-WLAN-02.tx t; Internet—Draft: QUIC, Internet Engineering Task Force, IETF; Standardworkingdraf, No. 2, May 25, 2021, pp. 1-13.

\* cited by examiner

DISTRIBUTED PROXY FOR ENCRYPTED TRANSPORT PROTOCOLS WITH EFFICIENT MULTI-PRIORITY MULTIPLEXED TRANSPORT FOR IMPROVING USER'S TRAFFIC QOS

CROSS-REFERENCE TO RELATED APPLICATION

This application claims the benefit of priority from U.S. Provisional Patent Application Ser. No. 63/343,927, filed on May 19, 2022, and from pending U.S. patent application Ser. No. 17/900,673, filed Aug. 31, 2022, both of which are entitled "DISTRIBUTED PROXY FOR ENCRYPTED TRANSPORT PROTOCOL WITH EFFICIENT MULTI-PRIORITY MULTIPLEXED TRANSPORT FOR IMPROVING USER'S TRAFFIC QOS." The entire contents of the above-referenced applications are incorporated herein by reference.

BACKGROUND

The Transmission Control Protocol (TCP) is used to carry a majority of internet traffic as a transport layer of the Open System Interconnection (OSI) and Internet Protocol (IP) model. TCP is a connection-oriented end-to-end protocol which provides reliable in-order delivery of packets between two endpoints. TCP congestion control tries to send data as fast as possible by making use of available network resource without suffering significant queuing delay and packet loss. A majority of congestion control algorithms in current deployments use loss-based congestion controls in which packet loss is used as a signal for network congestion to reduce the sending rate. Transport headers in TCP packets are sent unprotected, without encryption and without integrity-protection, and are subject to modifications by middleboxes on the path of a TCP connection in the network.

Most TCP implementations are not optimized for wireless links in mobile cellular networks and satellite networks. Off-the-shelf TCP suffers from significant rate reduction in case of packet loss in a wireless link due to misinterpreted network congestion signal, long end-to-end loss recovery delay, overwhelming number of TCP acknowledgements (ACKs) in the return link from a client to the server, long startup delay to increase the congestion window, limited congestion window and/or limited socket buffer size at steady state and so on.

TCP Performance Enhancing Proxies (PEP) are deployed in mobile cellular networks and broadband satellite systems to enhance user's Quality of Experience (QoE) of internet applications, such as lower page load time, higher video streaming resolution, less rebuffering and shorter file upload and download time. Furthermore, TCP PEP minimizes required bandwidth.

Split-TCP is usually used in a distributed TCP performance enhancing proxy in a broadband satellite system. An end-to-end TCP connection is split into three connections: (1) local area network (LAN) TCP connection between client devices and a satellite terminal, (Customer Premise Equipment (CPE)), (2) satellite TCP (or proprietary protocol) connection between a satellite terminal and a satellite gateway, and (3) wide area network (WAN) TCP connection between a satellite gateway and internet web servers. A TCP connection entering a satellite terminal, or the gateway is converted into a satellite-friendly connection and is restored back to regular TCP prior to leaving the satellite network.

The split-TCP approach helps improve the performance and efficiency of TCP protocol in a satellite broadband system.

QUIC (Quick UDP (user datagram protocol) Internet Connections) is slated to be a replacement for TCP for the Web. It was initially developed by Google and became an IETF standard in 2021. QUIC encrypts almost all of its packet headers in addition to its encrypted packet payload. It runs over UDP but offers TCP features and is designed to perform better than TCP by improving shortcomings of TCP. It provides end-to-end reliable delivery of packets between two end points. One QUIC connection multiplexes multiple independent "streams" to avoid head of line (HOL) blocking when loss of packets occurs. Packet loss only affects the stream whose data is carried in the lost packets and other streams can go on. The same TCP congestion control algorithms can be used in QUIC. Since QUIC encrypts its packet headers and runs over UDP, existing TCP PEPs will no longer work with QUIC and user's QoE previously improved by PEPs will vanish.

End-to-end loss recovery of QUIC uses end-to-end Automatic Repeat Request (ARQ) which does not work well for high Round Trip Time (RTT) links. Usually, there are three different types of links between a client and a server in a satellite system: (1) a Wi-Fi link between a client and a satellite terminal, (2) a satellite link between a terminal and a satellite gateway and (3) a terrestrial link between the gateway and an Internet Web server. Any packet loss in any of the three links requires loss recovery between a client and a server over the high RTT satellite link. Without PEPs, packet loss degrades page load time, file upload and download time and video resolution, and also incurs frequent rebuffering in video streaming.

To provide the best QoE to a user, classification and prioritization of traffic flows is required to satisfy different QoS requirements of different applications especially in mobile and satellite broadband networks with constrained radio resources and network conditions. Prioritization in PEPs allows efficient use of radio resources and provide the best Quality of Service (QoS) to user's applications for TCP. Without PEPs, a user's QoE will be poor and communication system resources may not be efficiently utilized.

A TCP receiver usually sends an ACK for every two packets received. A QUIC receiver behaves similarly. For video streaming and file download application, ACKs are carried over the return link from a terminal to the gateway. Without PEPs, QUIC implementation needs to be optimized to reduce number of ACKs. Since the return link is usually constrained and has lower date rate, it can be overwhelmed by ACKs. The ACK congestion can adversely impact the transmission of other application data in the return link and consequently the throughput in the forward link.

Therefore, what is needed is a distributed proxy system for encrypted transport protocols like QUIC for improving user's traffic QoS and efficient use of network resource without being a man-in-the-middle (MITM) solution, which breaks the secure communication between a client and a server.

SUMMARY

In one general aspect, the instant disclosure presents a distributed proxy device for transmitting data packets between client devices and web servers over an access network using an Encrypted Transport (ET) Proxy Backbone Protocol that is independent of an ET protocol in use between a client device and a web server. The distributed proxy device includes an ET Proxy module for a customer premises equipment (CPE) configured to receive incoming ET proxy packets from an ET proxy backbone module and transmit outgoing ET proxy packets to an ET proxy backbone module, and set up an HTTP tunnel with an ET proxy client of the client device for receiving incoming user datagram protocol (UDP) payloads from the client device and transmitting outgoing UDP payloads to the client device via a local area network (LAN). The ET proxy module is also configured to receive prioritization preferences from the ET proxy client at client devices pertaining to the UDP payloads indicating preferred quality-of-service (QoS) classes for the UDP payloads, and schedule transmission of the outgoing UDP payloads via the HTTP tunnel based on QoS classes of the outgoing UDP payloads. The distributed proxy device also includes a connection manager module configured to maintain an ET proxy connection table that includes an entry for each established ET Proxy connection between the client device and other end devices, each entry including connection information, and a traffic characterization module configured to passively monitor packet information of the outgoing UDP payloads. The distributed proxy device includes a classifier module configured to classify each of the outgoing UDP payloads into one of a plurality of different QoS classes based on the monitored packet information and based on the prioritization preferences received from the ET proxy client at client devices, and an ACK reduction module configured to reduce a number of UDP payloads to be proxied over the ET Proxy access tunnel network based on the monitored packet information.

In yet another general aspect, the instant disclosure presents a distributed proxy device for transmitting data packets between client devices and web servers over an access network using an Encrypted Transport (ET) Proxy Backbone Protocol that is independent of an ET protocol in use between a client device and a web server. The distributed proxy device includes an ET Proxy module configured to receive incoming ET proxy packets from an ET proxy backbone module and transmit outgoing ET proxy packets to an ET proxy backbone module and set up an HTTP tunnel with an ET proxy for receiving incoming user datagram protocol (UDP) payloads from the web server and transmitting outgoing UDP payloads to the web server via a wide area network (WAN). The ET proxy module is also configured to communicate prioritization preferences to the ET proxy at web servers pertaining to the UDP payloads indicating preferred quality-of-service (QoS) classes for the UDP payloads and schedule transmission of the outgoing UDP payloads via the HTTP tunnel based on QoS classes of the outgoing UPD payloads. The distributed proxy device also includes a connection manager module configured to maintain an ET proxy connection table that includes an entry for each established ET Proxy connection between the web server and other end devices, each entry including connection information and a traffic characterization module configured to passively monitor packet information of the outgoing UDP payloads. The distributed proxy device a classifier module configured to classify each of the outgoing UDP payloads into one of a plurality of different QoS classes based on the monitored packet information and an ACK reduction module configured to reduce a number of UDP payloads to be proxied over the ET Proxy access tunnel network based on the monitored packet information.

In a further general aspect, the instant application provides a distributed proxy device for transmitting data packets between client devices and web servers over an access network using an Encrypted Transport (ET) Proxy Backbone Protocol that is independent of an ET protocol in use between a client device and a web server. The distributed proxy device includes an ET proxy backbone module configured to set up ET Proxy Backbone connections with another distributed proxy device, each ET Proxy Backbone connection including multiple ET Proxy Backbone channels for transmitting ET proxy packets having different QoS classes, each ET Proxy Backbone channel including a separate queue, schedule transmissions of the ET proxy packets from each respective queue, multiplex the ET proxy packets from each respective queue via the associated ET Proxy Backbone channel, perform local recovery of network impairments over the access network and perform congestion control to prevent packets from client devices and web servers from causing network congestion to the access network. The distributed proxy device also includes an ET Proxy module configured to receive incoming ET proxy packets from an ET proxy backbone module and transmit outgoing ET proxy packets to the ET proxy backbone module and set up an HTTP tunnel with an ET proxy client of the client device for receiving incoming user datagram protocol (UDP) payloads from the client device and transmitting outgoing UDP payloads to the client device via a local area network (LAN). The ET proxy module is also configured to receive prioritization preferences from the ET proxy client at client devices pertaining to the UDP payloads indicating preferred quality-of-service (QoS) classes for the UDP payloads and schedule transmission of the outgoing UDP payloads via the HTTP tunnel based on QoS classes of the outgoing UPD payloads. The distributed proxy device also includes a connection manager module configured to maintain an ET proxy connection table that includes an entry for each established ET Proxy connection between the client device and other end devices, each entry including connection information, and a traffic characterization module configured to passively monitor packet information of the outgoing UDP payloads. The distributed proxy device includes a classifier module configured to classify each of the outgoing UDP payloads into one of a plurality of different QoS classes based on the monitored packet information and based on the prioritization preferences received from the ET proxy client at client devices and an ACK reduction module configured to reduce a number of UDP payloads to be proxied over the ET Proxy access tunnel network based on the monitored packet information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
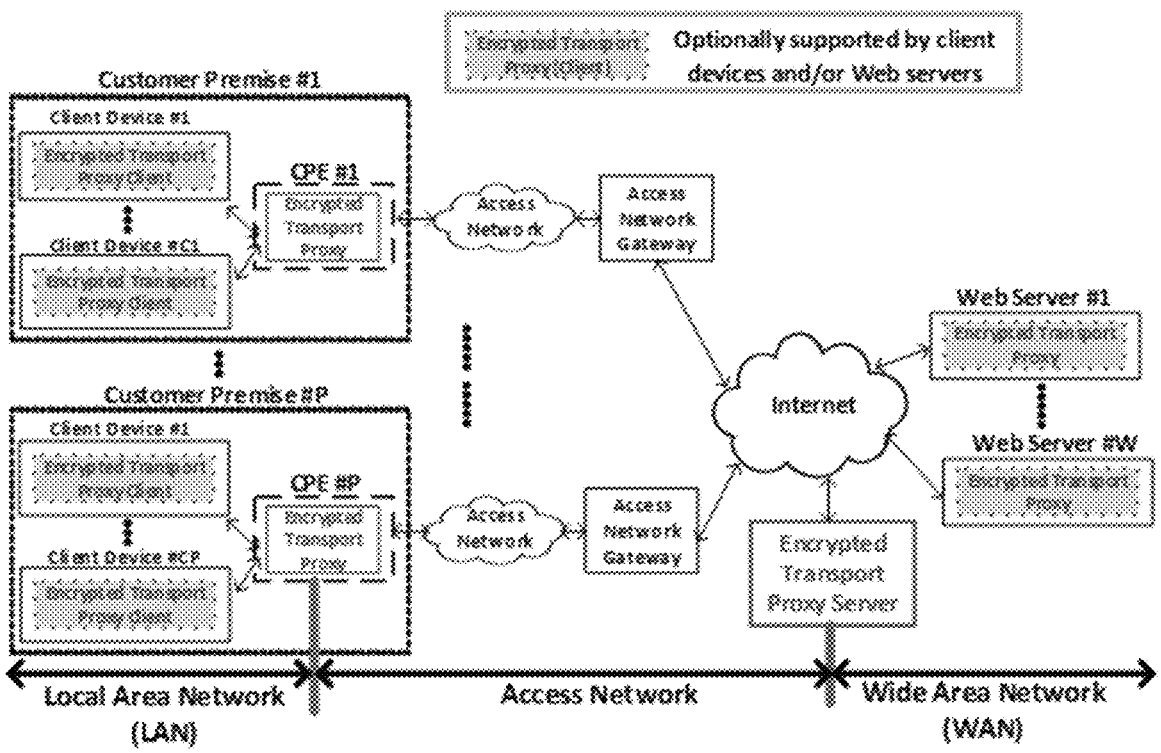
FIG. 1 is a diagram which illustrates a distributed encrypted transport proxy system for improving user's traffic QoS and efficient use of network resources.

FIG. 1 shows an example of a distributed encrypted transport proxy system 100 for improving user's traffic QoS and efficient use of system resource in accordance with this disclosure. The system of FIG. 1 shows a number P of customer premises 102. Each customer premise 102 includes of a customer premise equipment (CPE) 104 and one or more client devices 106. The CPEs comprise any terminal and associated equipment located at a customer's premises and connected to a service provider's telecommunication circuit. In embodiments, the CPEs may comprise satellite terminals. The client devices 106 may be personal or handheld computing devices having or being connected to input/output elements that enable a user to interact with various applications. Examples of suitable client devices include but are not limited to personal computers, desktop computers, laptop computers, mobile telephones, smart phones, tablets, phablets, smart watches, wearable computers, gaming devices/computers, televisions, and the like.

The client devices 106 may be connected to the associated CPEs 104 by a respective local area network. The local area network 108 may be one or more wired or wireless networks, such as Wi-Fi or ethernet. The CPEs 104 are connected to an access network 110. Access networks 110 may include one or more of low earth orbit (LEO), medium earth orbit (MEO), and/or geostationary orbit (GEO) satellite systems, 3G/4G/5G mobile wireless systems, and terrestrial internet access systems, such as cable, fiber and digital subscriber line (DSL).

Each access network 110 is connected to the Internet 114 via an access network (AN) gateway 112. AN gateways 112 may be an aggregation point of many customer premises 102, such as a satellite gateway, a central office for fiber, cable, DSL and packet data gateway for a mobile cellular system. The Internet 114 is a wide area network (WAN) that connects gateways 112 to internet web servers 116. Client devices 106 communicate with web servers 116 located in the Internet 114 via a CPE 104 and an access network 110. In accordance with this disclosure, at least one Encrypted Transport (ET) Proxy Server 124 is connected to the Internet 114, and each CPE 104 includes an ET proxy 126 (e.g., software). AN gateways 112 and ET proxy server(s) 124 may be either co-located or in different locations.

The communication path between a client device and a web server can be divided into three segments: (1) Local Area Network (LAN) 118 between a client device 106 and a CPE 104, (2) Access Network (AN) 120 between a CPE 104 and an encrypted transport proxy server 124, and (3) Wide Area Network (WAN) 122 between the ET proxy server 124 and web servers 116.

LAN 118, AN 120 and WAN 122 have different network/ line characteristics due to the use of different communication technologies and network architectures. Wi-Fi is usually used in LAN 118 and it is also known as Wireless LAN, WLAN. Access network technologies are many and varied: DSL, cable, Fiber, 2G, 3G, 4G, 5G, and low/medium/ geosynchronous satellite. The link between the ET proxy server 124 and a web server 116 in WAN 122 is usually high-speed wireline link.

The distributed ET proxy system 100 comprises two main components: (1) ET proxy 126 in each CPE 104 through which user data travels to and from the internet, and (2) one or more ET proxy servers 124 connected to the Internet 114. As discussed below, in embodiments, client devices 106 may include ET proxy clients 128. The ET proxy client 128 sets up an ET proxy access tunnel (explained in more detail below) with the ET proxy between the client device 106 and the CPE 104 and all encrypted transport protocol traffic is transported through the tunnel. In addition, in some embodiments, Internet web servers 116 may provide ET proxy service 130 and the ET proxy server 124 sets up an ET proxy channel (explained in more detail below) between the ET proxy server 124 and the Internet web server ET proxy service 130. In embodiments, a web server can be another ET proxy server, which connects to web servers, or a frontend cloud server serving many backend application servers. In FIG. 1, ET proxy 126 at the CPEs 104 and ET proxy server 124 in the Internet 114 are shown as solid rectangular boxes while optional ET proxy client 128 at client devices 106 and ET proxy services 130 at web servers 116 are depicted as shaded dotted boxes.

Figure 2:
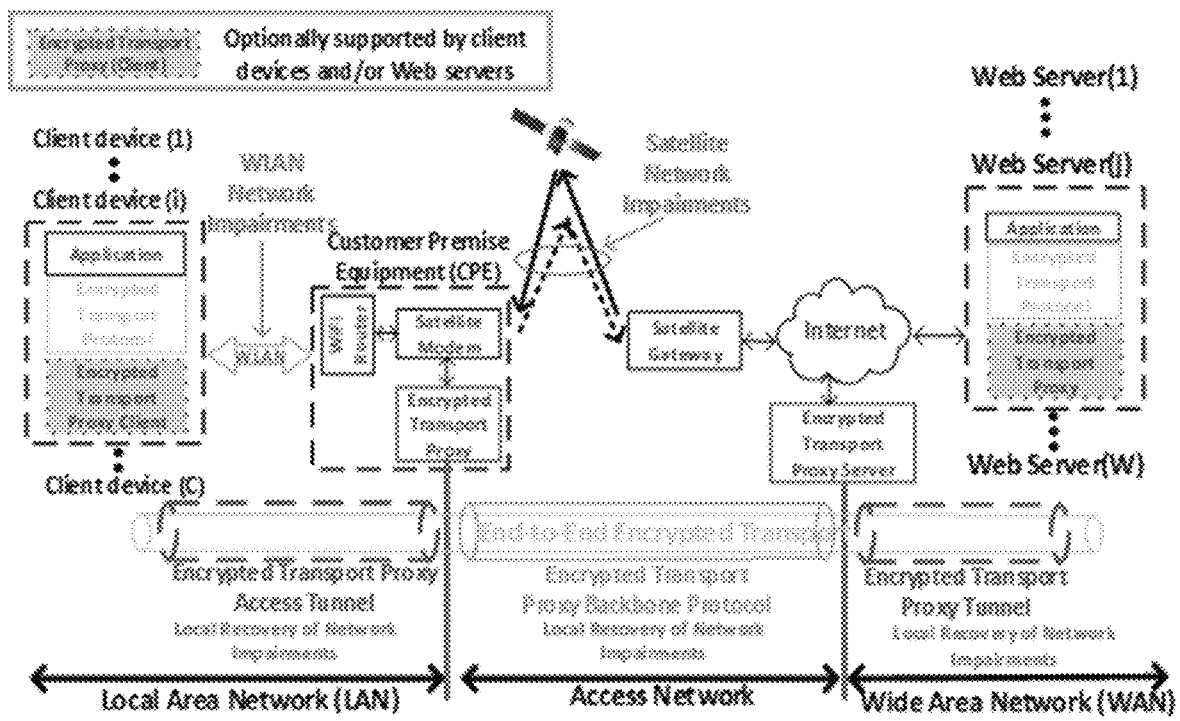
FIG. 2 is a diagram which illustrates a distributed encrypted transport proxy system in a broadband satellite system.

FIG. 2 shows a distributed ET proxy system 200 for one customer premise 102 in a broadband satellite system. There are a number C of client devices 106 connected to a CPE 104 (e.g., satellite terminal) through a Wi-Fi Local Network (WLAN) 108. The satellite terminal (CPE) communicates with a satellite gateway 112 (i.e., AN gateway) through a satellite 202. The satellite gateway 112 is connected to the Internet 114 to communicate with a number W of web servers 116.

In FIG. 2, the client devices 106 communicate with web servers 116 through three links with different characteristics: (1) in the LAN 118, a Wi-Fi (WLAN)) link 108 between the client devices 106 and the satellite modem 204 in the CPE 104, (2) in the Access Network 120, a satellite link 202 between the satellite terminal 104 and the satellite gateway 112, and the link between the satellite gateway 112 and the ET proxy server 124 which is usually a high-speed wireline link, and (3) in the WAN 122, the link between the ET proxy server 124 and and web servers 116.

WLAN 108, access network 120 and WAN 122 may exhibit different network impairments such as packet loss, packet reordering, Round Trip Time (RTT) delay, jitter, and variation in data rate. GEO satellites may have a higher RTT while LEO satellites may have a higher jitter (delay variation). There can be significant packet loss and low data rate in WLAN especially when a device is in a disadvantaged location with respect to the Wi-Fi access point. The network impairment in WAN 122 may be lowest.

An application in a client device 106 communicates with an application in a web server 116 using an end-to-end Encrypted Transport Protocol 208, such as QUIC over the WLAN, satellite and WAN links. The present disclosure provides an ET proxy protocol for proxying end-to-end encrypted transport protocols, such as QUIC. To enable an ET transport proxy protocol proxying an end-to-end encrypted transport protocol, such as QUIC, backbone tunnels 210 are established between the ET proxy 126 in the satellite terminal 104 and the ET proxy server 124 in the Internet 114 using what is referred to herein as an ET proxy backbone protocol (ETPBP) ahead of the time before user traffic arrives. As noted above, the ET proxy server 124 may be co-located with a satellite gateway 112 or located separately. ETPBP provides local recovery of satellite link impairments, multiplexed prioritized transport, ACK reduction and congestion control to prevent client's devices and web servers from causing network congestion.

In embodiments, the client devices 106 in FIG. 2 may be installed with an optional ET proxy client 128. The ET proxy client 128 sets up an ET proxy access tunnel 212 with the ET proxy 126 in the satellite terminal 104 which in conjunction with an ET proxy backbone tunnel 210 enables client devices 106 to send and receive end-to-end encrypted transport packets between the client device 106 and a web server 116. This tunnel 212 is intended to perform local recovery of WLAN (Wi-Fi) network impairments, congestion control to prevent end devices from causing network congestion, and prioritized transport between the client device and the satellite terminal. The tunnel 212 and the ET proxy client 128 are depicted with dotted lines in FIG. 2 because the ET proxy protocol is optional between client devices 106 and the satellite terminal 104.

In embodiments, the web servers 116 may include the ET proxy software 130 which enables another ET proxy tunnel 214 to be built between the ET proxy server 124 and the web server 116 to locally recover WAN network impairments, perform congestion control to prevent web servers from causing network congestion, and prioritized transport. The tunnel 214 and the ET proxy 130 in the web server 116 are depicted with dotted lines in FIG. 2 because the ET proxy protocol is optional between the ET proxy server 124 and the web servers 116.

The distributed ET proxy system can be operated in three different modes: Mode 1—ETPBP between a satellite terminal 104 and the ET proxy server 124 without client device's support and without web server's support for ET proxy, Mode 2—ETPBP between a satellite terminal 104 and the ET proxy server 124 with client device 106 support for ET proxy (e.g., ET proxy client 128) and without web server support for ET proxy, and Mode 3—ETPBP between a satellite terminal 104 and the ET proxy server 124 with client device 106 support (e.g., ET proxy client 128) and with web server support for ET proxy (e.g., ET proxy software 130). Mode 1 is the major operating mode of the ET proxy system as it does not require the installation of special software or special clients in client devices 106 or web servers 116. In Mode 2, a user is required to install ET proxy client software and to enable the ET proxy. For Mode 3, in addition to user's opt-in for ET proxy, it requires web servers 116 to utilize ET proxy support.

Mode 1: ETPBP Between a CPE and the ET Proxy Server

Figure 3:
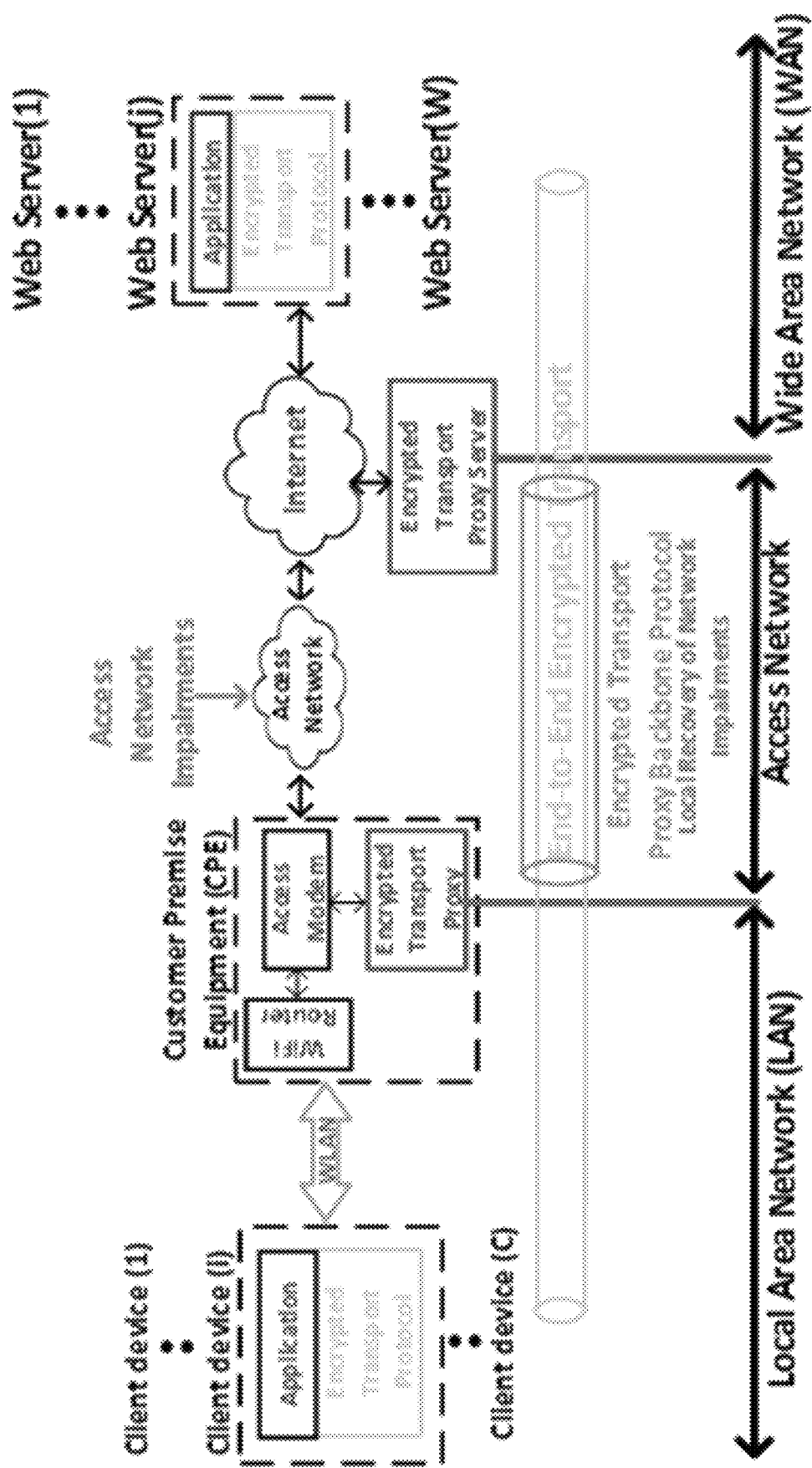
FIG. 3 illustrates a distributed encrypted transport proxy system without client device's support and without web server's support for encrypted transport proxy (Mode 1).

FIG. 3 depicts a distributed encrypted transport proxy system 300 for implementing Mode 1. In this mode, ET proxy protocol is not utilized between client devices 106 and satellite terminals 104 and between the ET proxy server 124 and web servers 116. Client devices are not aware of the existence of the ET proxy (access network). This is known as transparent proxy. An application in a client device 106 communicates with the application in a web server 116 over an end-to-end encrypted transport protocol 208, such as QUIC, between the client device 106 and the web server 116.

To enable ET proxy protocol in Mode 1, ETPBP backbones are set up between the ET proxy 126 in the satellite terminal 104 and the ET proxy server 124 in the WAN or Internet 114 to transport ET packets. The transfer of data from a client device 106 to a web server 116 in Mode 1 will now be described. The ET proxy 126 in the satellite terminal 104 receives packets from the underlying encrypted transport protocol (referred to herein as ET packets) (e.g., QUIC packets) carried as payloads in internet protocol (IP)/user datagram protocol (UDP) packets from a client device 106. The ET proxy 126 extracts the ET packets and sends them over the ETPBP backbones 210 to the ET proxy server 124. The ET proxy server 124 receives the ET packets from ETPBP backbones 210 and then wraps the ET packets in IP/UDP packets with appropriate headers to the web servers 116.

The transfer of data from a web server 116 to a client device 106 will now be described. The ET proxy server 124 receives ET packets as payload in IP/UDP packets from the web server 116 and then extract ET packets. The ET proxy server 124 then sends the extracted ET packets over ETPBP backbones 210 to the ET proxy 126 in the satellite terminal 104. The ET proxy 126 wraps the ET packets in IP/UDP packets as payload with appropriate headers and sends the IP/UDP packets to the client device 106.

Figure 4:
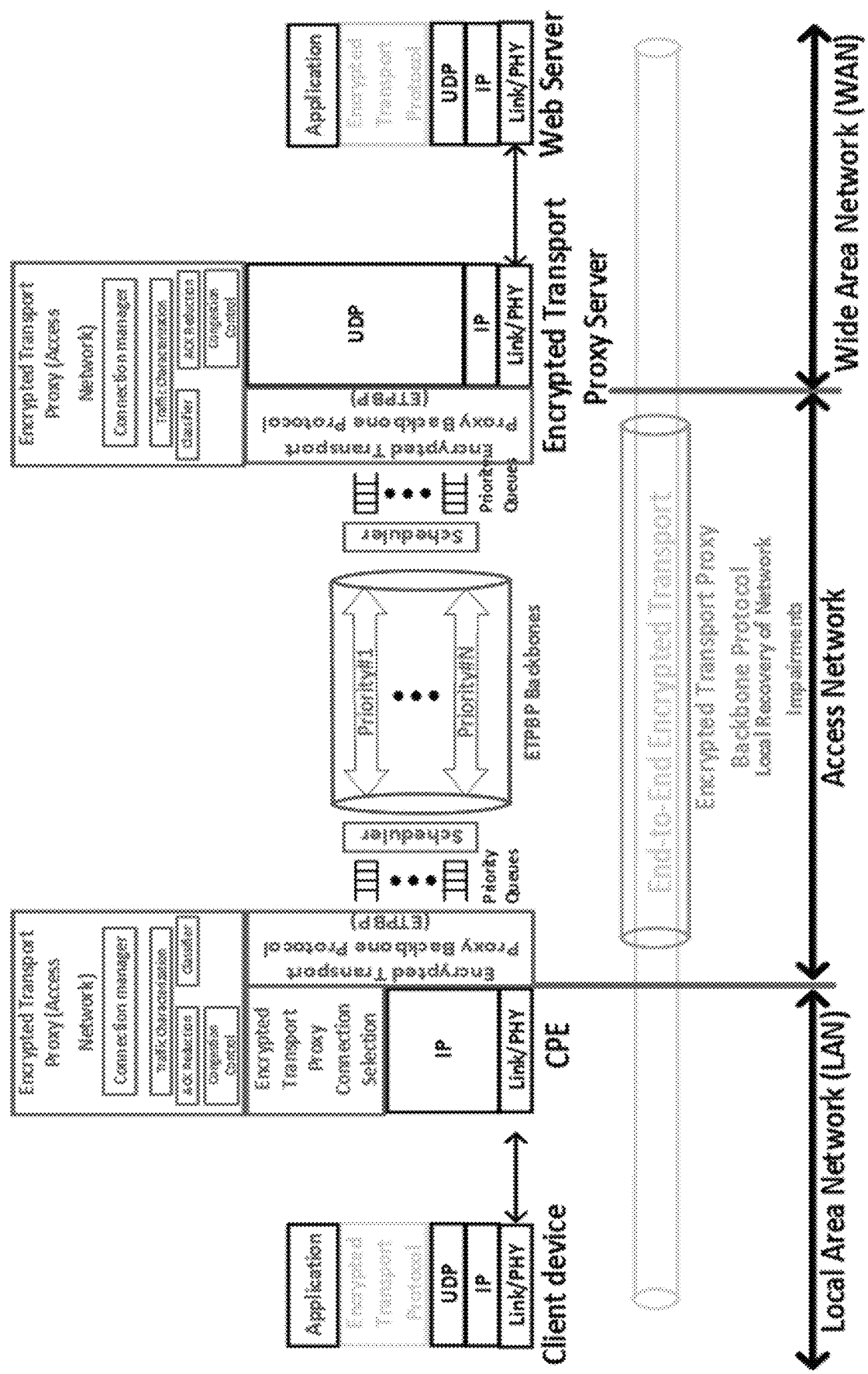
FIG. 4 illustrates functional blocks, system components and protocol stacks of a distributed encrypted transport proxy system without client device's support and without web server's support for encrypted transport proxy (Mode 1).

FIG. 4 shows the functional blocks, system components and protocol stacks of a distributed encrypted transport proxy system without client device 106 support and without web server 116 support for encrypted transport proxy, such as depicted in FIG. 3. An application 402 on a client device 106 communicates with an application server 304 on a web server 116 using an encrypted transport protocol 208, such as QUIC, which runs over UDP over IP. The CPE 104 receives IP packets with encrypted transport protocol 208 from a client device 106 destined for a web server 116. The ET proxy connection selection module 406 at the CPE 104 selects the IP packets according to a set of configured rules and transports them over ETPBP backbones 210 to the encrypted transport proxy server 124.

The connection manager module 416 in the ET proxy 126 at the CPE 104 does bookkeeping of ET protocol connections selected by the connection selection module 406 and transferring packets between the LAN interface 411 of the CPE and ETPBP backbones 210 with appropriate headers. The connection manager module 416 in the ET proxy server 124 performs the same functions as connection manager module 408 at the CPE 104 except the following differences: (1) Managing packets between the ETPBP backbones 210 and the WAN interface 410 of the proxy server 124 facing the internet 114, and (2) Managing UDP sockets 412 communicating with the web server 116. Although the ET proxy 126 at the CPE may be shown as handling ET proxy traffic for a single client device in the drawings, the ET proxy 126 may handle traffic from any number of client devices at a customer location. Similarly, although ET proxy server 124 may be shown as handling ET proxy traffic for a single web server and a single client device in some drawings, ET proxy server 124 may handle traffic for any number of web servers and any number of client devices.

The ETPBP modules 414, 415, located at the CPE 104 and at the ET proxy server 124, respectively perform a number of functions, such as set up backbone connections with different priorities, scheduler services the packets from queues of different QoS classes over the backbone connections with corresponding QoS class, multiplex packets from ET protocol connections with the same QoS class over a backbone connection, provide local recovery of network impairments over the access network, and congestion control to prevent client's devices and web servers from causing network congestion.

Traffic characterization (TC) modules 418 passively monitor information on UDP packets in both directions for a UDP flow between a client device 106 and a web server 116. The TC module 418 analyzes the statistics and provide the output to the ACK reduction module 420 and the classifier module 422. The ACK reduction module 420 in the ET proxy 126 at the CPE 104 receives estimated ACK information from the TC module 418 and may reduce the number of ET protocol ACK packets to be transmitted over the access network. Based on the information from the TC module 418, the classifier module 422 at the CPE 104 and at the ET proxy server 124 classifies packets from the selected connections into Quality of Service (QoS) classes and put them into queues of different QoS classes to be transported over ETPBP backbones 210 over the access network.

Figures 5, 6:
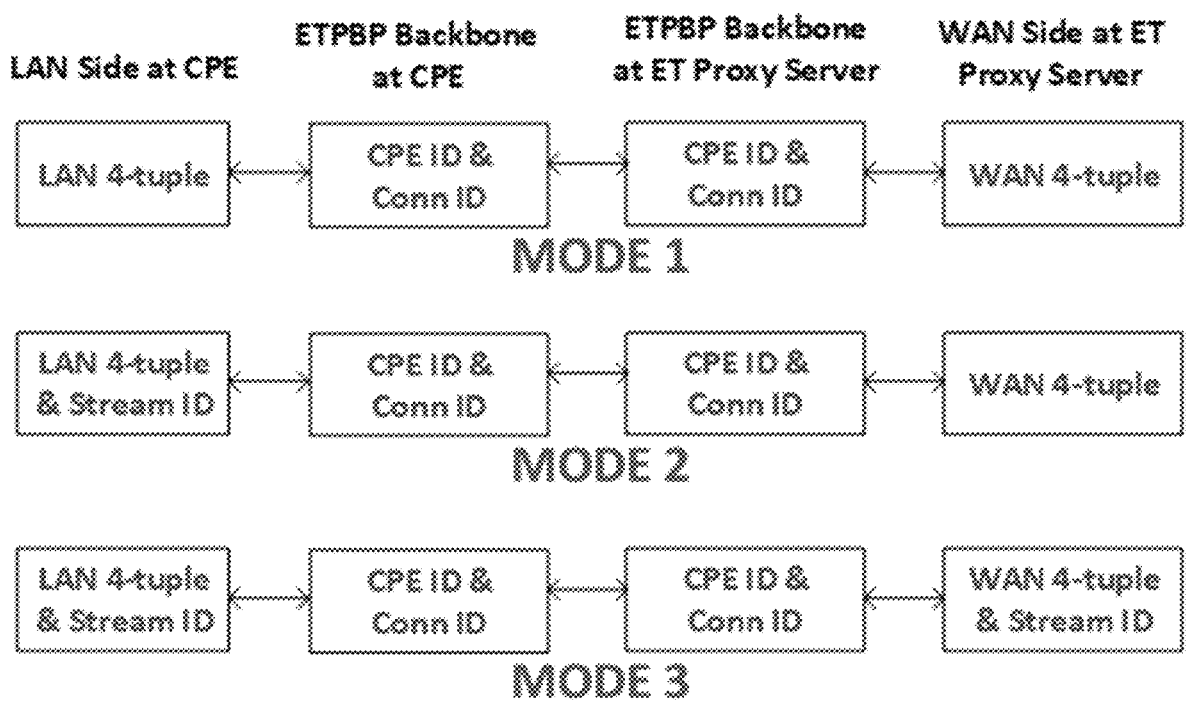
FIG. 5 illustrates an example of connection selection rule at CPE to decide if a packet is to be carried over ETPBP backbones.
FIG. 6 illustrates an example of connection bookkeeping between a CPE and an encrypted transport proxy server.

In transparent proxy mode, UDP packets from a client device 106 are destined to a web server 116. Therefore, IP packets arriving at CPE 104 are checked if they are in UDP protocol and if they match a rule in the connection rule table. A connection rule table defines one or more rules for the UDP packets to be proxied. An example of a connection rule table is shown in FIG. 5. Example rules include destination port (Dst Port), source IP address (Src IP) in Classless Inter-Domain Routing (CIDR) format and destination IPv4 address (Dst IP) in CIDR format. The first row says that UDP/IP packets with source address 192.168.10.0-192.168.10.255, any destination IPv4 and destination UDP port 443 is to be proxied, i.e., transported using the ET proxy protocol. 4-tuples and UDP payload are obtained from UDP/IP packets matching a rule in the connection selection rule table. A 4-tuple may include the source IP address (LAN and private IP address) from the IP header, destination IP address (public IP address) from the IP header, source UDP port number from the UDP header, and destination UDP port number from the UDP header.

Stream multiplexing is used to transmit data between a CPE and an ET proxy server in Mode 1, between a client device and an ET proxy server in Mode 2, and between a client device and a web server in Mode 3. Stream multiplexing enables multiple streams of data (i.e., unique connections between clients and web servers) to be established over a single communication link. Stream multiplexing is enabled using unique identifiers for each segment of an ET proxy connection, e.g., from client to CPE, CPE to ET proxy server, and ET proxy server to web server.

As shown in FIG. 6, in Mode 1, an encrypted transport UDP connection has a unique identifier corresponding to a 4-tuple for paths to and from client devices and paths to and from web servers or a CPE ID and a Connection ID (Conn ID) for paths on ETPBP Backbones. At the LAN side of the CPE, the LAN 4 tuples taken from IP/UDP packets may be used as the unique identifier. A LAN 4-tuple may include the following: (1) client's source IP address (Src IP) from IP header: client's device IP address at the LAN which is usually a private IP address, (2) client's destination IP address (Dst IP) from IP header: web server IP address at the Internet which is a public IP address, (3) client's source UDP port number (Src Port) from UDP header: ephemeral port number of the client which is changed for each new connection, and (4) client's destination UDP port number (Dst IP) from UDP header: web server UDP port number which is a static well-known port number.

At the WAN side of the ET proxy server, WAN 4 tuples taken from IP/UDP packets may be used as the unique identifier. A WAN 4-tuple may include the following: (1) ET proxy server's source IP address (Src IP): ET proxy server's device IP address at the Internet, a public IP address, (2) ET proxy server's destination IP address (Dst IP): web server IP address at the Internet, a public IP address, (3) ET proxy server's source UDP port number (Src Port): ephemeral port number of ET proxy server which is changed for each new connection, (4) ET proxy server's destination UDP port number (Dst IP): web server UDP port number which is a static well-known port number.

Unique identifiers for use at ETPBP backbone at the CPE and the ET proxy server, CPE ID and Conn ID may be used as the unique identifier. For the CPE ID, a number which uniquely identifies a CPE may be used. For the Conn ID, a number which uniquely identifies an encrypted transport UDP connection at a CPE may be used.

Figure 7:
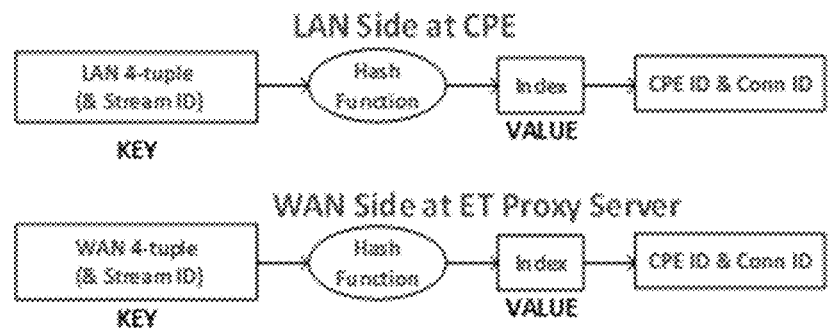
FIG. 7 illustrates an example of connection table maintained by a connection manager of an encrypted transport proxy (access network) at a CPE and at an encrypted transport proxy server and an example of connection lookup using LAN and WAN 4-tuples (and LAN stream ID for Mode 2 and 3, and WAN stream ID for Mode 3).

FIG. 7 shows an example of connection table maintained by the connection manager module 316 at CPE 104 and at ET proxy server 124 and an example of a table lookup using 4-tuples. In the example of FIG. 7, the connection table includes the following entries: Index, CPE ID, Conn ID, LAN 4-tuple, Lan Stream ID, WAN 4-tuple, WAN Stream ID, Active, and State. The Index entry is used as the index to connection information. The CPE ID is the identifier unique to each customer premise/equipment. The Conn ID entry is the Identifier to a connection which can be unique globally or for a given CPE ID. The LAN 4-tuple is the UDP/IP 4-tuples from the LAN interface of a CPE. For Mode 2 and 3, destination IP address and port is not that of the proxy tunnel. They are web server IP address and port to which client's device is connecting. They are conveyed in tunnel setup message. The LAN Stream ID is the stream identifier in an ET proxy protocol tunnel between a client device and a CPE, corresponding to the UDP flow that is proxied in Mode 2 and Mode 3. The WAN 4-tuple is the UDP/IP 4-tuples from the WAN interface of a ET proxy server. For Mode 2 and 3, destination IP address and port is not that of the proxy tunnel. They are web server IP address and port to which client's device is connecting. They are conveyed in tunnel setup message. WAN Stream ID is the stream identifier in an ET proxy protocol tunnel between a ET proxy server and a web server, corresponding to the UDP flow that is proxied in Mode 3. The Active entry indicates whether the packet transaction is active within a pre-defined interval or idle. The State entry identifies the state of the transfer. Example states include handshake (HS), data transfer (DATA), etc.

Examples of how connection information is looked up, converted, and header fields are reconstructed at different interfaces of a CPE and a ET proxy server will now be described. For packets arriving at the LAN interface of a CPE (Mode 2 and 3 require LAN stream ID to be included in a key), a hash table can be maintained with a key equal to a LAN 4-tuple and a value equal to an index, which points to a row in the connection table. The index value for each packet may then be determined as a function of the hash table, e.g., Index=HashFunction (LAN 4-tuple). A new entry is added to the connection table when a new connection arrives with the generated Index value. Referring to the connection table in FIG. 7, CPE ID and Conn ID may be obtained from Index derived from LAN 4-tuples.

For packets transmitted over ETPBP backbones from the CPE, UDP payload from packets from connections with different LAN 4-tuples are multiplexed and transmitted over a ETPBP backbone with headers, which include CPE ID and Conn ID.

For packets arriving at the WAN side of a ET proxy server (Mode 3 requires WAN stream ID to be included in a key), similar to the LAN interface of a CPE, a hash table can be used with a key equal to a WAN 4-tuple such that Index=HashFunction (WAN 4-tuple).

For packets transmitted over ETPBP backbones from the ET proxy server, UDP payload from packets from connections with different WAN 4-tuples are multiplexed and transmitted over a ETPBP backbone with headers, which include CPE ID and Conn ID.

For Packets received from ETPBP backbones at the CPE, packets arrive with CPE ID and Conn ID in the headers and CPE ID and CONN ID are used to look up LAN 4-tuples (or LAN Stream ID for Mode 2 and 3) from the connection table.

For packets transmitted to the client device in the LAN interface of the CPE, source and destination IP address and UDP port number in the LAN 4-tuples are swapped, respectively, such that: source IP address is swapped with web server IP address; destination IP address is swapped with client device IP address; source UDP port number is swapped with web server UDP port number; and destination UDP port number is swapped with client UDP port number. For modes 2 and 3, stream ID in the tunnel is LAN Stream ID. UDP/IP packets are then constructed using UDP payload received from the ETPBP backbones and newly assembled 4-tuples and transmitted to the client device in the LAN interface of the CPE.

For packets received from ETPBP backbones at the ET proxy server, packets arrive with CPE ID and Conn ID in the headers, and CPE ID and CONN ID are used to look up WAN 4-tuples ((WAN Stream ID for Mode 3) from the connection table.

For packets transmitted to the web server in the WAN interface of the ET proxy server, in this case, no swapping of source and destination IP address and UDP port number is required. WAN 4-tuples from the connection table are used directly. For example, source IP address corresponds to ET proxy server public IP address, destination IP address corresponds to web server IP address, source UDP port number corresponds to ET proxy server UDP port number, and destination UDP port number corresponds to web server UDP port number. For Mode 3, stream ID in the tunnel corresponds to WAN Stream ID. UDP payload received from the ETPBP backbones are transmitted in UDP sockets with WAN 4-tuple in the WAN interface of the ET proxy server.

ET Proxy Backbone Protocol (ETPBP)

Encrypted Transport Proxy Backbone Protocol is used to transport UDP payload with LAN and WAN 4-tuples between a CPE and an ET proxy server over an access network. ETPBP is optimized for an access network. For example, if the access network is Geo satellite broadband internet, ETPBP is optimized for the satellite link by minimizing Acks, by performing fast local error recovery and by prioritizing latency sensitive application traffic.

As shown in FIG. 4, ETPBP backbone connections 210 are set up in advance between a CPE 104 and an ET proxy server 124. There is a plurality of priority backbone connections 430 and a plurality of priority queues 432 associated with each priority connection 430. Each priority connection/queue belongs to a QoS class. Different applications require different QoS requirements to provide the best QoE to a user. Examples of QoS classes include interactive class, streaming class, real-time class and bulk class.

The classifier module 422 classifies the packets to be transmitted over ETPBP backbones into different QoS classes and puts them into priority queues 432 accordingly. Without proper provision of differentiated service based on QoS requirement of each application, for example, IP packets from an interactive application, such as online banking, may get stuck behind a large number of packets from a bulk application, such as a big file download. As a result, the user of online banking application will experience a very large delay to load the page and will finally give up. There is a scheduler 434 which services the priority queues 432 according to the network resources available. For example, in a Geo satellite broadband network, satellite radio resources are allocated to priority queues 432 by the scheduler 434 to transmit the packets over the satellite. As an example, packets from all UDP connections with the same priority are multiplexed and transmitted over the ETPBP connection of that priority.

Figure 8:
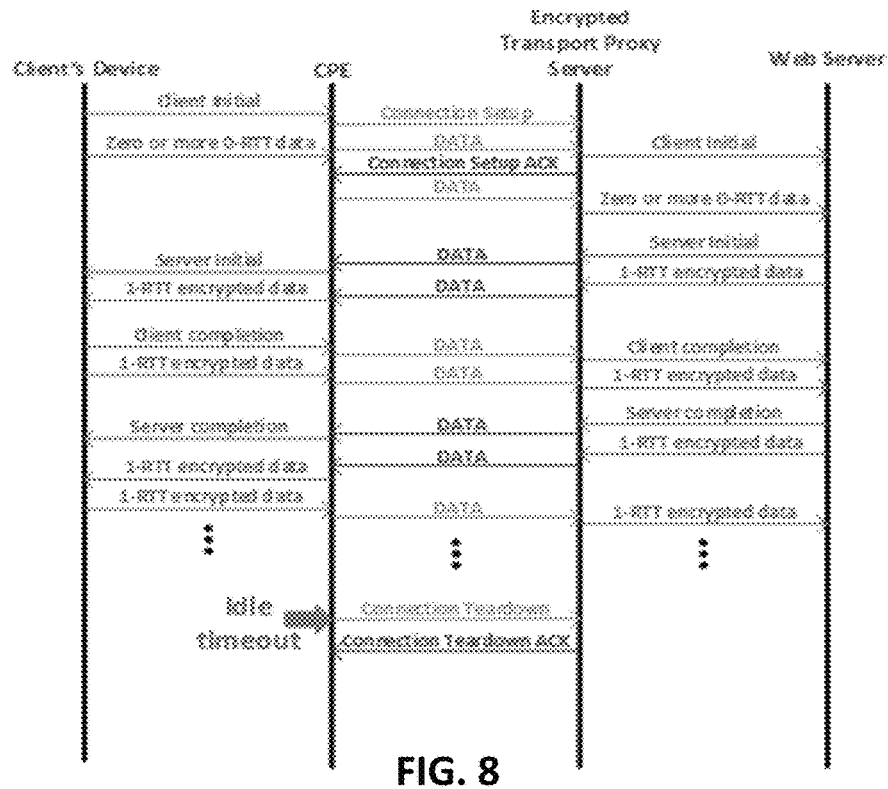
FIG. 8 illustrates connection establishment, teardown, and data packet flows over ETPBP backbones between a CPE and ET proxy server.

FIG. 8 depicts an example of connection establishment, teardown, and data packet flows for QUIC connections over ETPBP backbones between a CPE and ET proxy server. When a CPE receives "Client Initial" packets from a client device, since it is the first packet of the QUIC connection, there is no entry in the connection table. The connection manager module adds the connection information in the table and sends "Connection Setup" message with connection information (e.g., CPE ID and Conn ID) to the ET proxy server. The CPE also transmits "Client Initial" packets as "DATA" packet to the ET proxy server. The ET proxy server adds the connection information in its table when it receives "Connection Setup" and replies with "Connection Setup ACK" to the CPE. The ET proxy server opens a UDP socket to the web server, adds WAN 4-tuples to the connection table, and then sends "Client Initial" to the web server. The CPE and the ET proxy server transfer "DATA" packets over the ETPBP backbones with UDP payload from packets received from the client device and from the web server.

Since QUIC is an encrypted transport protocol with encrypted transport header, it does not expose the end of a connection. The only indication to on-path devices that a QUIC flow has ended is that packets from that QUIC flow (4-tuple) are no longer observed. Therefore, an "Idle timeout" timer is used to detect the end of a QUIC connection. For example, "Idle timeout" is set to a predetermined amount of time, e.g., 30 seconds to 3 minutes. After continuous idle period of a predetermined duration without any packets from both directions, the CPE declares that the connection has ended. It then sends "Connection Teardown" message to the ET proxy server and the ET proxy server replies with "Connection Teardown ACK" to the CPE. Both the CPE and the ET proxy server clear the state information of the connection and removes the entry in the connection table.

End-to-end loss recovery of encrypted transport protocol (e.g., QUIC) uses end-to-end ARQ, and it does not work well for access networks with high RTT such as Geo satellite broadband networks. A local reliable delivery is provided in ETPBP, which is optimized for the access network link impairments and achieves faster recovery of impairments without waiting for the end-to-end reactions.

Reliable delivery of packets has been achieved using three different approaches. One approach is Selective Repeat ARQ with a sliding window such as used in TCP and QUIC transport protocols. When there is an out-of-order packet arrival at the receiver, it sends a negative acknowledgement to the sender to notify potential loss of packets, or when a retransmission timer at the sender, which is usually long, expires, the sender retransmits the packets. While no redundancy is added, the retransmission delay is at least one RTT between the sender and the receiver when there is a packet loss. Another approach is packet level Forward Error Correction (FEC). Packet level FEC adds some additional loss recovery packets for some "N" packets that are sent. The redundant loss recovery packets are used to recover some of the original "N" packets when some of them gets lost. While no additional delay is required to recover packet losses within the capability of packet level FEC scheme, redundant packets are added and some of the network resources are wasted when there is no packet loss. There can be some delay in waiting for more packets to construct a FEC code blocks for some FEC methods. The third approach is combined packet-level FEC and ARQ. Packet level FEC can recover random packet losses with low packet error rate without incurring significant redundancy. If packet loss characteristics of the link is beyond the capability of packet level FEC with reasonable redundancy, it can be beneficial to combine FEC together with ARQ.

The ET proxy protocol according to this disclosure utilizes the third approach, i.e., combined packet-level FEC and ARQ, for reliable delivery of packets. Reliable delivery of packets can be implemented in different layers of the protocol stack, e.g., the link layer and the transport layer. Loss recovery at the link layer can be optimized for the link it is trying to fix and is more effective and efficient. It is employed between two end points of a link. When there are more than one links between the CPE and the ET proxy server, each link requires local loss recovery. Reliable delivery at the transport layer provides loss recovery for all the links between two end points but it cannot be optimized for all the links. It incurs more overhead than at the link layer and can be less efficient than link layer recovery. In embodiments, delivery of packets is implemented in the link layer because loss recovery at the link layer can be optimized for each link.

Figure 9:
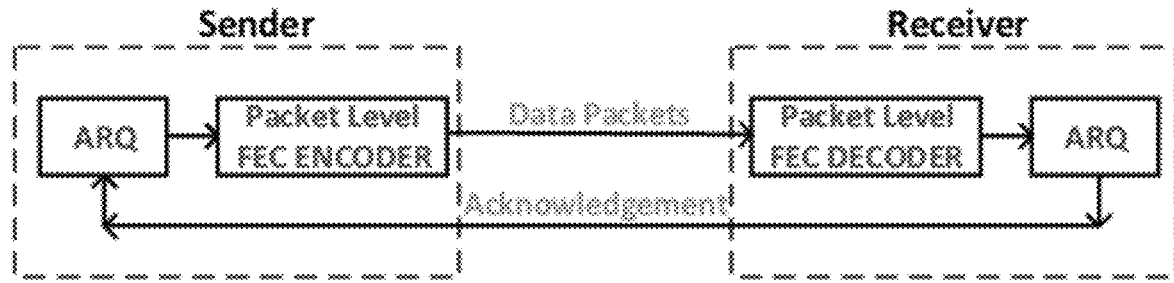
FIG. 9 illustrates combined ARQ and packet level FEC for reliable delivery for ETPBP backbones.

FIG. 9 depicts combined packet level FEC and ARQ for reliable delivery of packets over ETPBP backbones to locally recover packet loss. The configuration of claim 9 shows a sender having a packet level FEC encoder module 902 and a ARQ module 904 and a receiver 906 having a packet level FEC decoder module 908 and an ARQ module 910. The FEC encoder 902 sends This configuration of the combined approach allows packet level FEC recover random packet loss first and the remaining packet loss is handled by the ARQ.

Packet level FEC considers entire packets as FEC source symbols. Consider a block code, (n, k) as an example: (n-k) repair packets are sent, e.g. by packet level encoder module 902, for each group of k source packets. Error correction capability varies depending on the FEC coding scheme used. (3,2) with XOR-based FEC generates one repair packet by XOR-ing two source packets and can recover one packet for two source packets. In case of two packets lost, one packet is recovered by the packet FEC, e.g., by decoding the repair packets using packet level FEC decoder 908, and the other is recovered by the ARQ modules 904, 910 by sending an negative acknowledgement by the receiver to the sender which retransmits the missing packet. Acknowledgement can be selective acknowledgements, negative acknowledgement or a combination. The number of acknowledgement packets is minimized to reduce the use of network bandwidth by making use of the knowledge of the link characteristics.

The combined approach may be designed for types of network impairments such as packet loss pattern and RTTs by trading redundancy in packet level FEC against delay of using ARQ. For low random packet errors, simple packet level FEC with small redundancy is sufficient since infrequent left-over packet error can be recovered by the ARQ. For frequent medium error rate, stronger packet level FEC can be used to minimize the delay in retransmission by the ARQ.

In some cases, access network providers and ET proxy service providers are not the same entity, and it is not feasible to have reliable delivery at the link layer managed by the ETPBP backbone protocol. One solution to this is to use reliable delivery at the transport layer. In reliable delivery at the transport layer, the access network gateway and the ET proxy server do not need to be co-located and can be several hops/links between them. Loss of packets in any of the links between them can be recovered by the reliable delivery at the transport layer.

The reliable transport protocol can be a customized version of QUIC or TCP, which is enhanced with combined packet level FEC and ARQ optimized for a particular type of network impairments and characteristics. Congestion control algorithm (CCA) of QUIC and TCP either is turned off or is optimized for the link. For example, for the Geo satellite broadband system, if the CCA is not turned off, it is optimized with a sufficiently large initial congestion window size, sufficiently short ramp-up delay to open up congestion window quickly, sufficiently large maximum congestion windows, send window and receive window, and/or sufficiently large flow control window size in QUIC.

Figure 10:
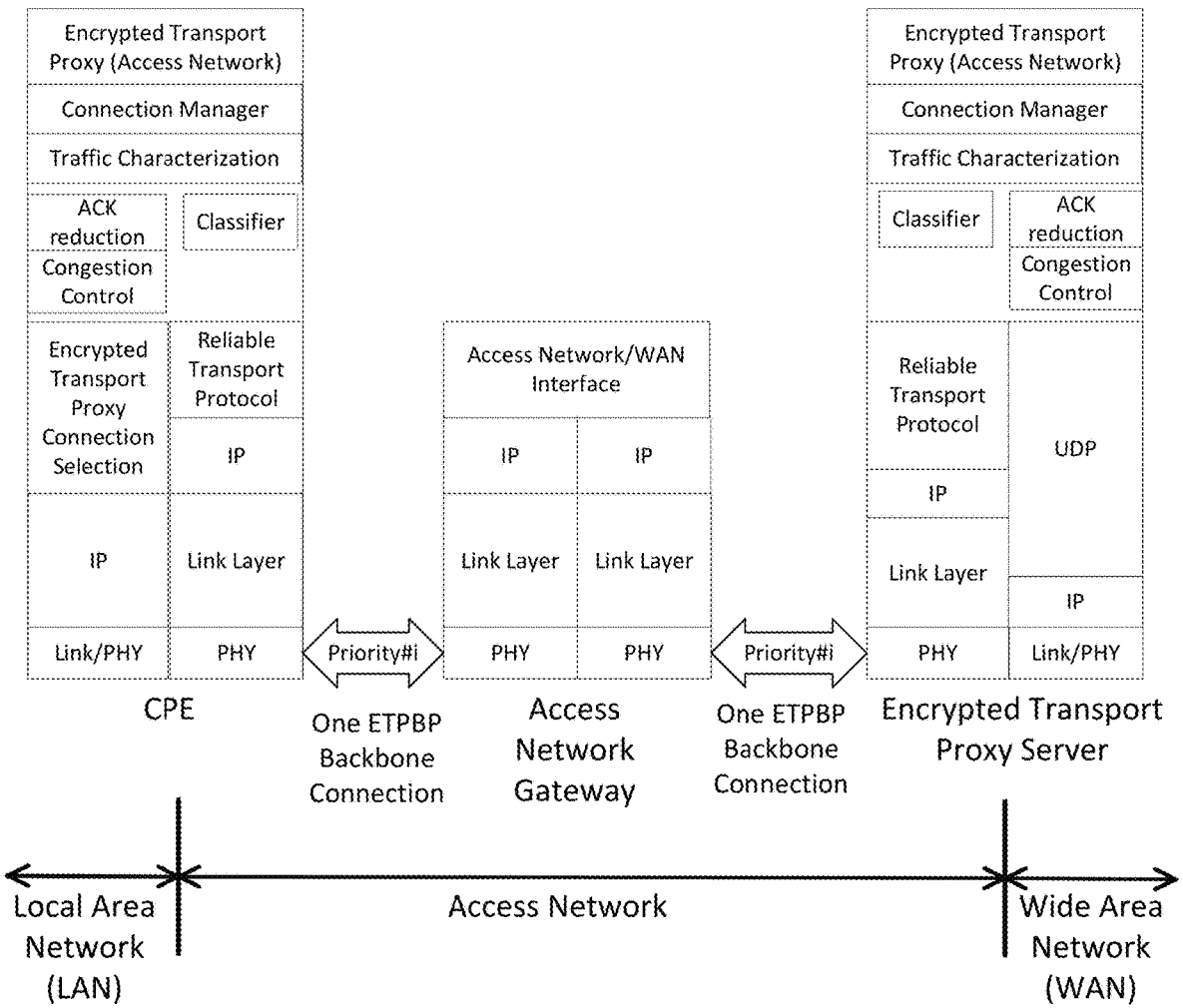
FIG. 10 illustrates reliable delivery at the transport layer for an encrypted transport proxy backbone protocol connection.

FIG. 10 shows an illustration of reliable delivery transport layer in the protocol stack for ETPBP backbones. All the network nodes between a CPE 106 and ET proxy server 124 treat ETPBP packets as regular IP packets without any special processing and route them accordingly.

Figure 11:
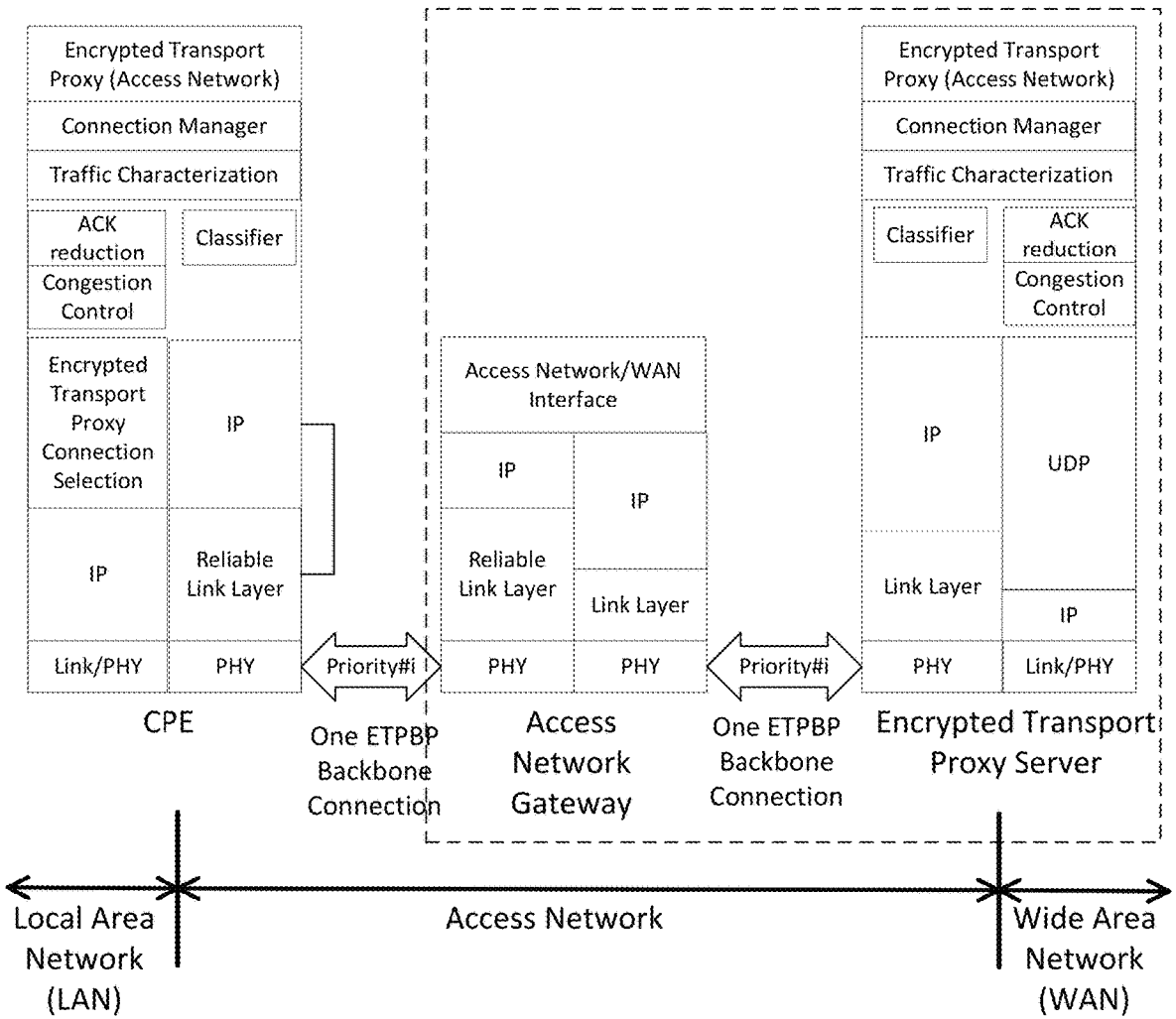
FIG. 11 illustrates reliable delivery at the link layer for an encrypted transport proxy backbone protocol connection.

FIG. 11 shows an illustration of reliable delivery link layer in the protocol stack for ETPBP backbones with ET proxy server 124 co-located with the access network gateway 112. There is no link with significant network impairment between the access network gateway 112 and the ET proxy server 124 and reliable delivery is not necessary between them, and it can be terminated at the access network gateway 124. The access network gateway 112 just forwards ETPBP packets as regular IP packets to the ET proxy server 124.

Link layer protocol of a link is closely related to the transmission medium and physical layer technology used in the link. Access network has different access technologies, such as satellite, mobile cellular, cable and fiber. In a Geo satellite access network, combined packet level FEC and ARQ is used for satellite link layer to recover satellite link impairments between a CPE (satellite terminal) and the access network gateway (satellite gateway). The combined FEC and ARQ is optimized for Geo satellite latency and packet loss.

Figure 12:
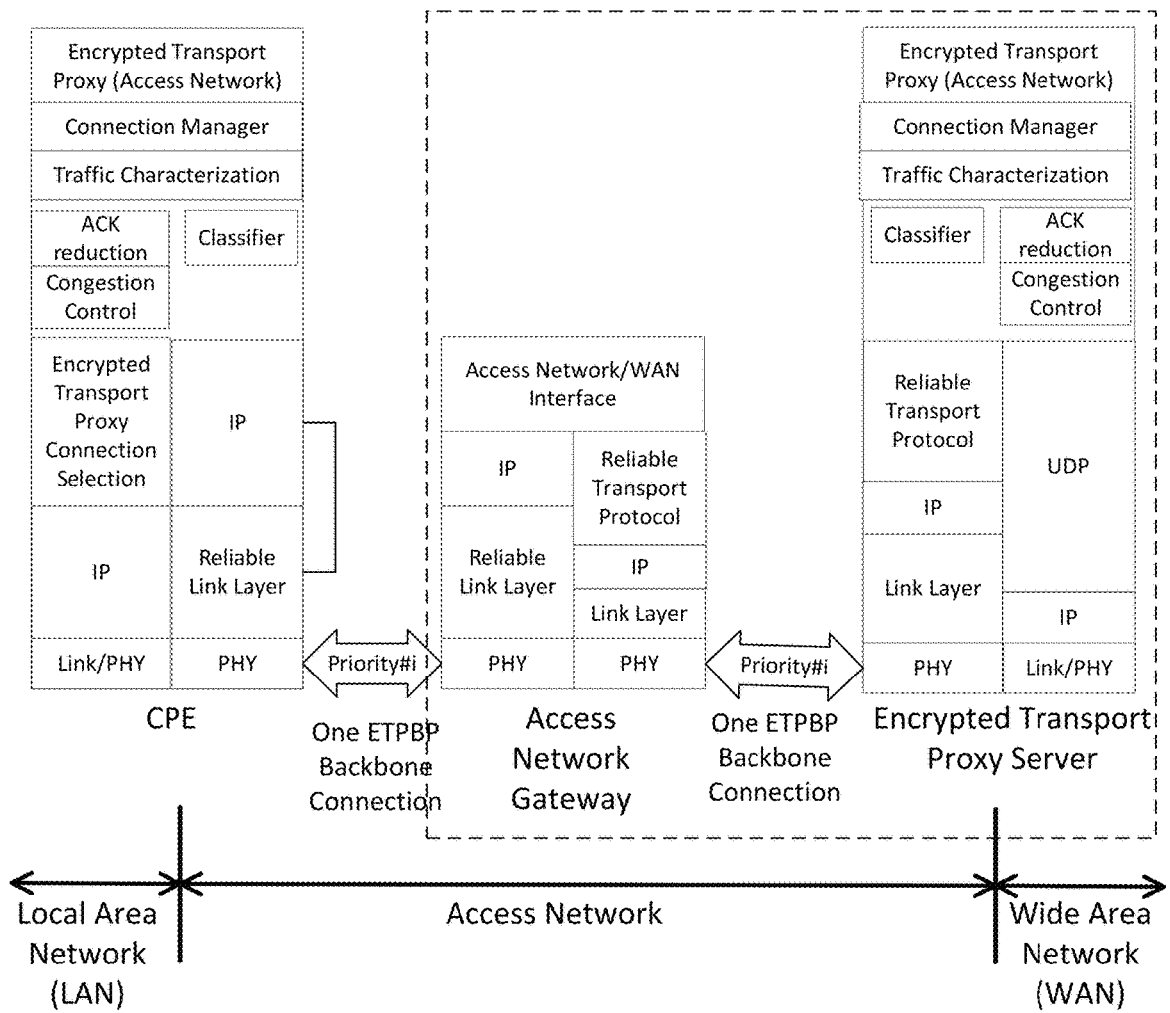
FIG. 12 illustrates reliable delivery at the link layer and the transport layer for an encrypted transport proxy backbone protocol connection.

FIG. 12 shows an illustration of reliable delivery link layer in the protocol stack for ETPBP backbones with ET proxy server not co-located with the access network gateway. The reliable delivery is provided at the link layer between a CPE and the access network gateway. The link between the access network gateway 112 and the ET proxy server 124 may have significant network impairment and reliable delivery is required between them. The access network gateway 112 receives IP packets from the CPE 106 over the reliable link layer and transport them to the ET proxy server 124 using the reliable transport protocol. Reliable transport protocol may be off-the-shelf TCP or QUIC protocol since the link may be a terrestrial link without much network impairment.

Figure 13:
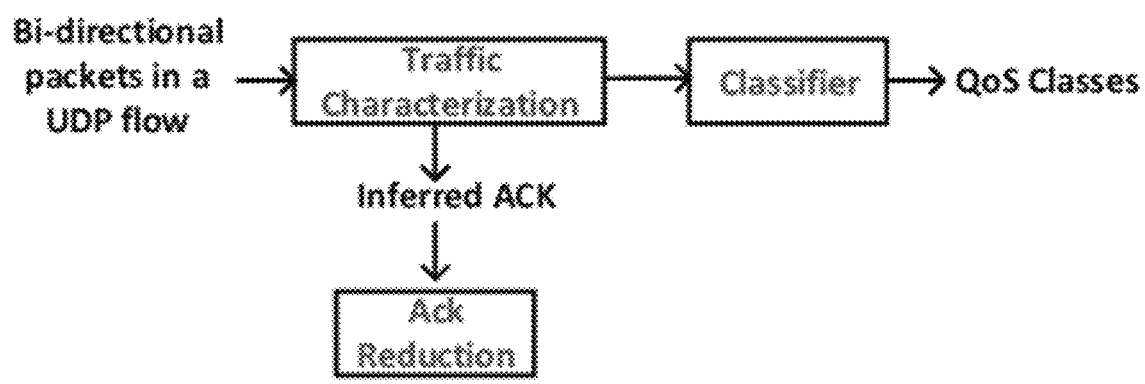
FIG. 13 illustrates traffic characterization for inferred ACK and QoS class classification.

As shown in FIG. 13, traffic characterization (TC) module 318 passively monitors information on UDP packets in both directions for a UDP flow between a client device and a web server. The TC module 318 analyzes packet level metrics such as payload size, packet times, relative packet position in two directions and protocol-specific information. The TC provides the results to the ACK reduction module 320 and the classifier module 322. Note that both encrypted transport protocol packet payload and most of its header are encrypted and not visible to the TC module 318.

Based on the passive monitoring of user's data and analysis, the TC module 318 infers acknowledgement packets and indicates their arrival to the Ack reduction module 320. The link from a CPE to the access network gateway can be constrained and high frequency of acknowledgement packets can have adverse impacts on other user's application traffic.

A number of actions may be taken to reduce the Ack packets sent by the Ack reduction module. As one example, the Ack packets may be dropped. For example, the Ack reduction module may be configured to drop a predetermined number of packets within a predetermined interval which may be dependent on the size of the Acks. For example, the Ack reduction module 320 may be configured to drop one Ack out of 5 Acks in 2 second intervals if the Ack is less than 50 Bytes. This may be useful with the QUIC protocol. QUIC uses selective acknowledgements and smaller packets include only positive acknowledgment and can be dropped since the Acks are cumulative and the next Ack carries the information contained in the previous one. Another action that can be taken to reduce Acks is to bundle Acks. For example, a predetermined number of Acks may be accumulated in a predetermined time interval and then delivered together in one transmission to the access network gateway. Packet dropping and combining may be employed together as well.

Using the analysis results from the TC module 318, the classifier module 322 classifies the UDP packets into QoS classes and put them in priority queues 432 of the ETPBP backbone connections 430 (FIG. 4). The classifier module 322 may be rule-based or machine-learning-based. In addition, the classifiers at a CPE 104 and at an ET proxy server 124 may be either independent or cooperative/integrated. In embodiments, the TC module for an ET proxy server 124 may be provided as a standalone unit at an access network gateway.

Reliable delivery with ARQ requires buffering of packets at the sender as well as at the receiver and buffer size is limited. Buffer overflow can happen at a CPE and/or at the ET proxy server when web servers and/or end user's devices sending traffic more than the access network can accommodate. The problem is more prominent especially at the ET proxy server serving a great number of CPEs. Buffering too many packets incur high queuing delay resulting in poor application performance and bad user's QoE.

Figure 14:
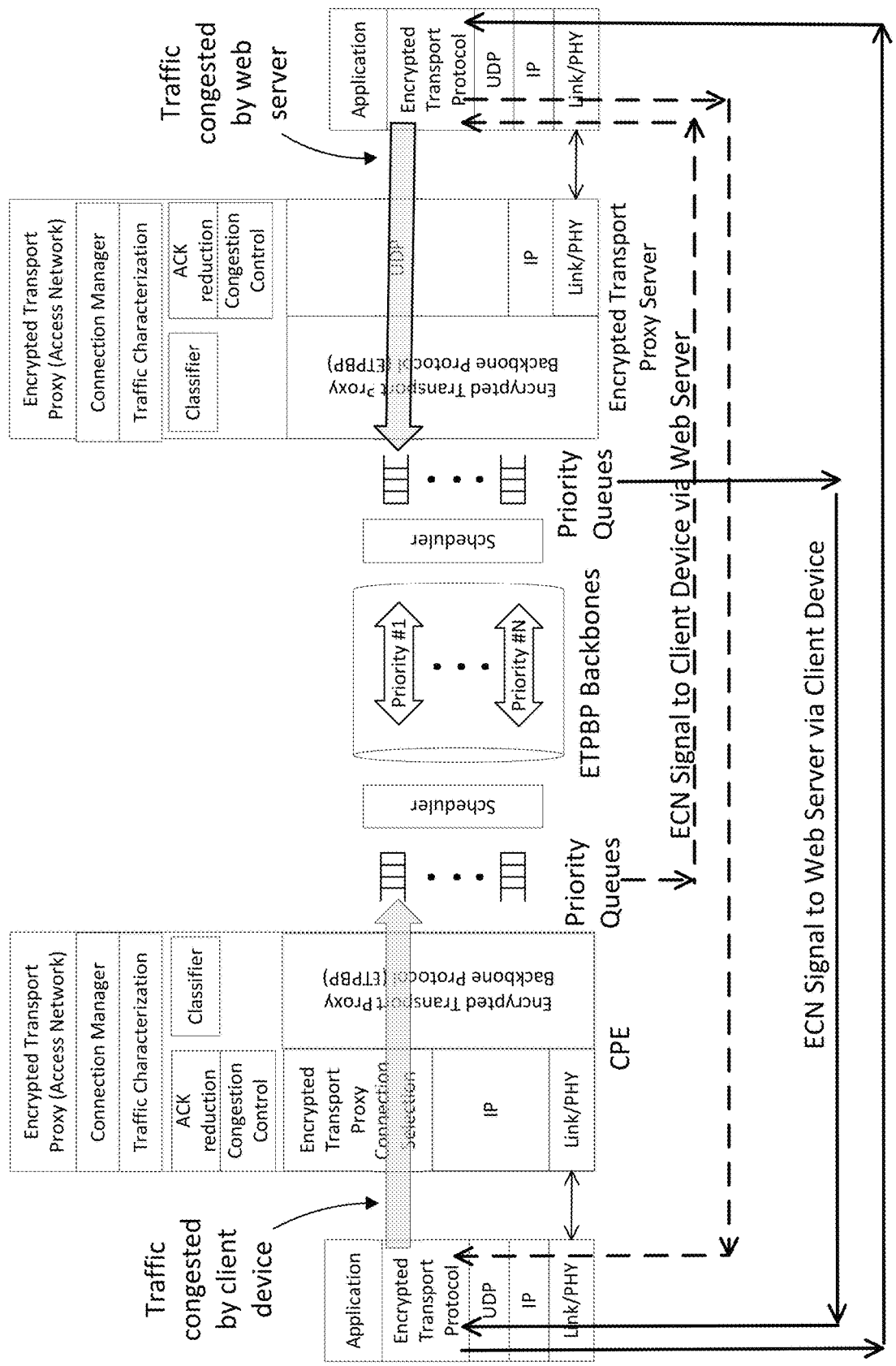
FIG. 14 illustrates use of ECN for congestion control of web servers and client devices at priority queues of the ETPBP backbones in Mode 1.

A number of approaches may be employed to prevent end points from congesting the access network. As one example, Active Queue Management (AQM) may be used to control the queue length or the mean time that a packet spends in a queue by "algorithmically" dropping packets instead of tail drop or head drop. As another example, explicit congestion control (ECN) may be used to notify end points by Congestion Experienced (CE) marking in the IP header instead of dropping packets. As yet another example, combined AQM and ECN may be used by marking CE first and by dropping packets if the sending rate is not reduced to a desirable level. In embodiments, AQM and ECN are applied to each of the priority queues 432 of ETPBP backbone connections 430 in a CPE 104 and the ET proxy server 124. FIG. 14 shows how an ECN signal generated at a priority queue 432 of ETPBP backbones propagate to a receiver (client device/web server) which reflect it in a ET protocol packet back to a sender (web server/client device) respectively.

Figure 15:
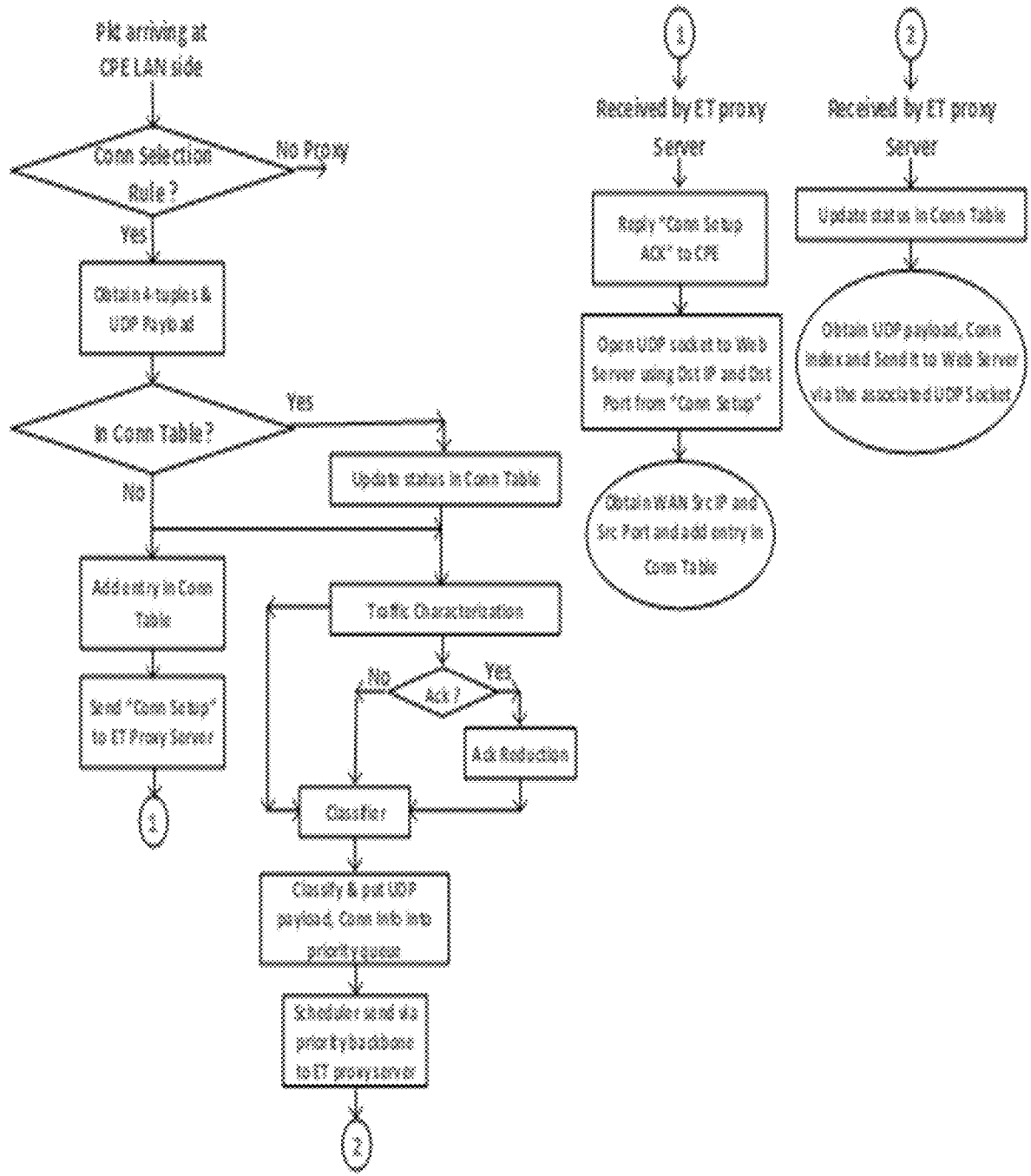
FIG. 15 illustrates events triggered by a UDP packet arrival at the CPE LAN side.

FIG. 15 is a flowchart showing a sequence of events triggered by an arrival of a UDP packets at the LAN interface of a CPE. At block 1502, a UDP packet flow is checked at a CPE for ET proxy connections, e.g., using the connection selection rules of FIG. 5. If a UDP connection is found, the 4-tuples and UDP payload are obtained (block 1504). If not, the UDP packet is passed along. Next, the connection table is checked to see if there is an entry for the UDP packet (block 1506). If there is no entry, a new entry is added to the table (block 1508) and a connection setup ("Conn Setup") message is sent proxy server (block 1510). The sequence then proceeds to (1) where the packet is received by the ET proxy server. The ET proxy server sends a "Conn Setup Ack" to the CPE (block 1524) and opens a UDP socket to a web server using destination IP address and destination port from "Conn Setup" message (block 1526). The WAN source IP address and source port are then added to the connection table (block 1528).

If there is an entry in the table, the status entry for the connection is updated (1512) in the table and traffic characterization begins (block 1514). In both cases (i.e., with/without an entry in the connection table, the UDP packet is sent to the classifier (block 1516) and to the Ack Reduction module (block 1522). If the UDP packet is an Ack, the Ack reduction module determines whether to perform an Ack reduction process, e.g., by dropping and/or accumulating the Ack. In either case, when the UDP packet reaches the classifier, the classifier classifies the packet and puts the UDP payload and Conn information into a priority queue depending on the classification (block 1518). The scheduler then sends the packet via a priority ET proxy backbone to the ET proxy server (block 1520). Control then moves to (2) where the packet is received by the ET proxy server. The ET proxy server updates the connection table (block 1530) and obtains the UDP payload and identifies the Conn Index and sends it to the payload to the web server via the associated UDP socket (block 1532).

Figure 16:
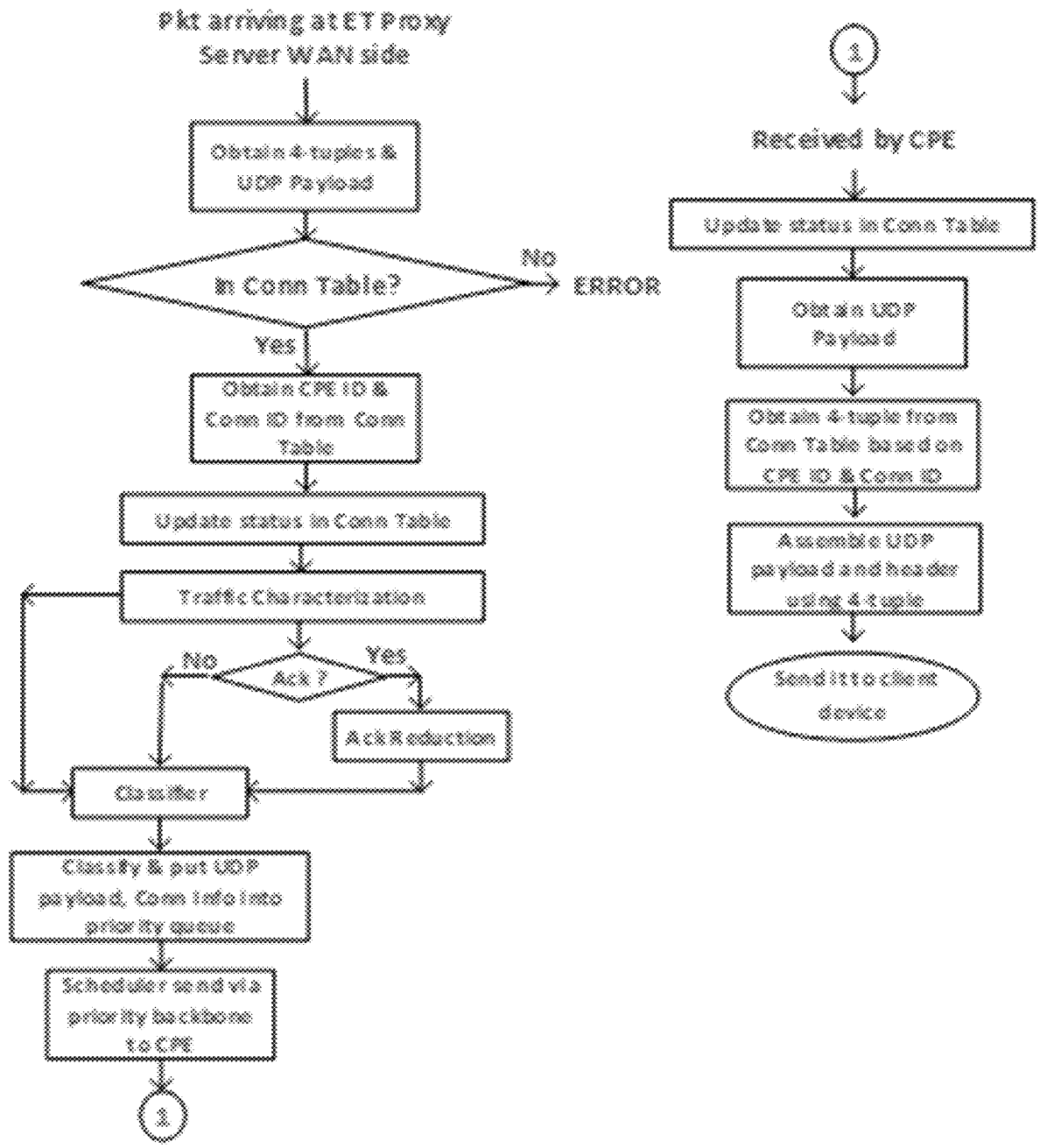
FIG. 16 illustrates events triggered by a UDP packet arrival at the CPE WAN side.

FIG. 16 is a flowchart of a sequence of events triggered by an arrival of a UDP packets at the WAN interface of a ET proxy server. When a UDP packet arrives at the WAN interface of the Et proxy server, the 4-tuples and UDP payload are obtained from the packet (block 1602). A check is made to see if the 4-tuple is in the connection table (block 1604). If the 4-tuple is not in the connection table, the packet may be discarded although, in some embodiments, such messages may be forwarded outside of the ET backbone protocol. An error message may then be generated. If it is, the CPE ID and Conn ID are obtained from the connection table (block 1606), and the status entry for the packet is updated in the connection table (block 1608). Traffic characterization then begins (block 1610). The UDP packet is sent to the classifier (block 1612) and to the Ack Reduction module (block 1618). If the UDP packet is an Ack, the Ack reduction module determines whether to perform an Ack reduction process, e.g., by dropping and/or accumulating the Ack. In either case, when the UDP packet reaches the classifier, the classifier classifies the packet and puts the UDP payload and Conn information into a priority queue depending on the classification (block 1614). The scheduler then sends the packet via a priority backbone to the CPE (block 1616). Control then moves to (1) where the packet is received by the CPE. The CPE updates the status entry in the connection table (block 1620) and obtains the UDP payload (block 1622) and the 4-tuple form the connection table based on the CPE ID and Conn ID (block 1624). The UDP payload and head using the 4-tuple is then assembled (block 1626) and sent to the client device (block 1628).

Figure 17:
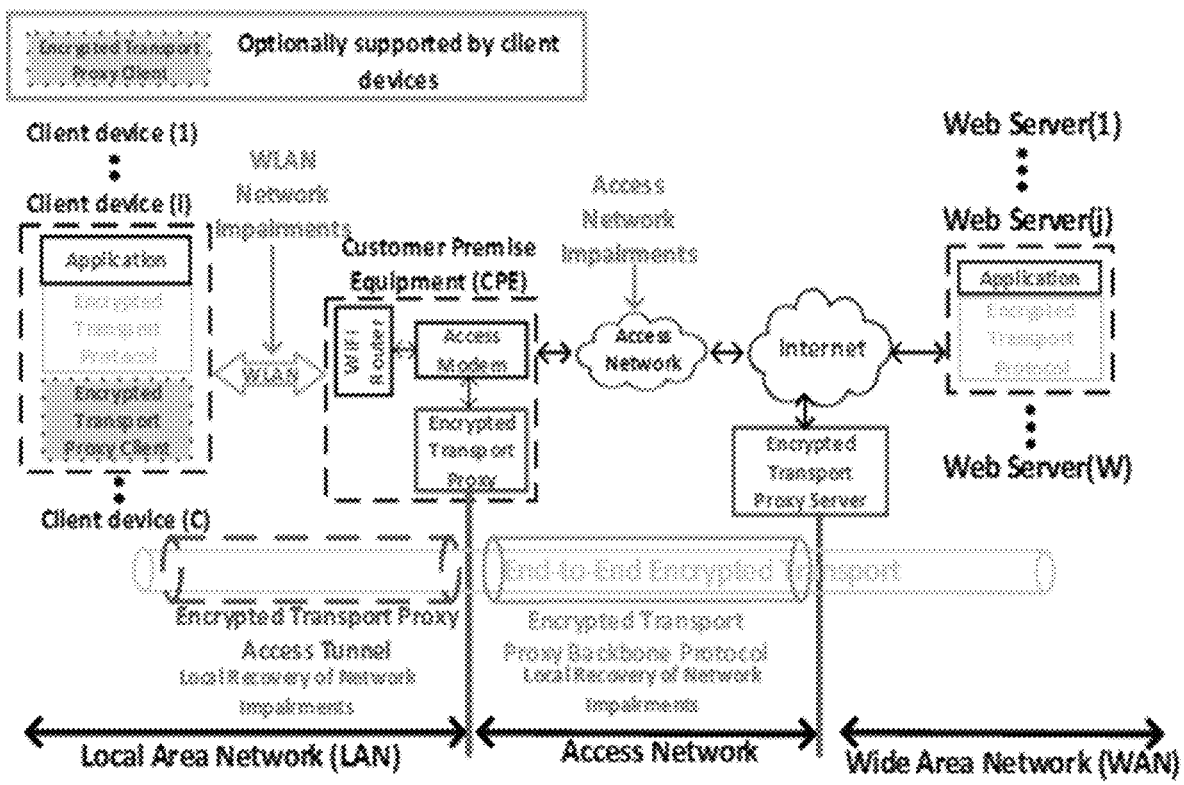
FIG. 17 illustrates distributed encrypted transport proxy system with the client device's support and without the web server's support for encrypted transport proxy (Mode 2).

Mode 2: ETPBP Between a CPE and the ET Proxy Server with Client Device Support for ET Proxy Mode 2 of the ET proxy protocol will now be described with regard to FIG. 17. In this mode, a client device 106 is installed with ET proxy client software 128 and the user chooses to use the ET proxy. It is known as explicit proxy mode since a user is aware of the existence of the ET proxy. FIG. 17 shows a distributed proxy system 1700 with ET proxy support from the client device 106 (but without the support from the web server). There is an ET proxy access tunnel 212 between a client device 106 and a CPE 104.

Referring to FIG. 17, an application 1702 in a client device 106 communicates with the application 1704 in a web server 116 over an end-to-end encrypted transport protocol 208 between the client device 106 and the web server 116. The ET proxy client 128 in the client device 106 send UDP payloads from ET protocol 1706 to the ET proxy 126 in the CPE 106 over the ET proxy access tunnel 212. The ET proxy 126 in the CPE 104 receives UDP payloads from the client device 106 through the ET proxy access tunnel 212 and sends them over ETPBP backbones 210 to the ET proxy server 124. The ET proxy server 124 operates in the same way as in Mode 1 described above.

When receiving data from the web servers 116, the ET proxy 126 in the CPE 104 receives ET packets from ETPBP backbones 210 and sends UDP payloads to ET proxy client 128 in client device 106 over ET proxy access tunnel 212. The ET proxy client 128 in the client device 106 receives UDP payloads from the CPE 106 and transfers them to the ET protocol 1706 back to the application 1702.

Figure 18:
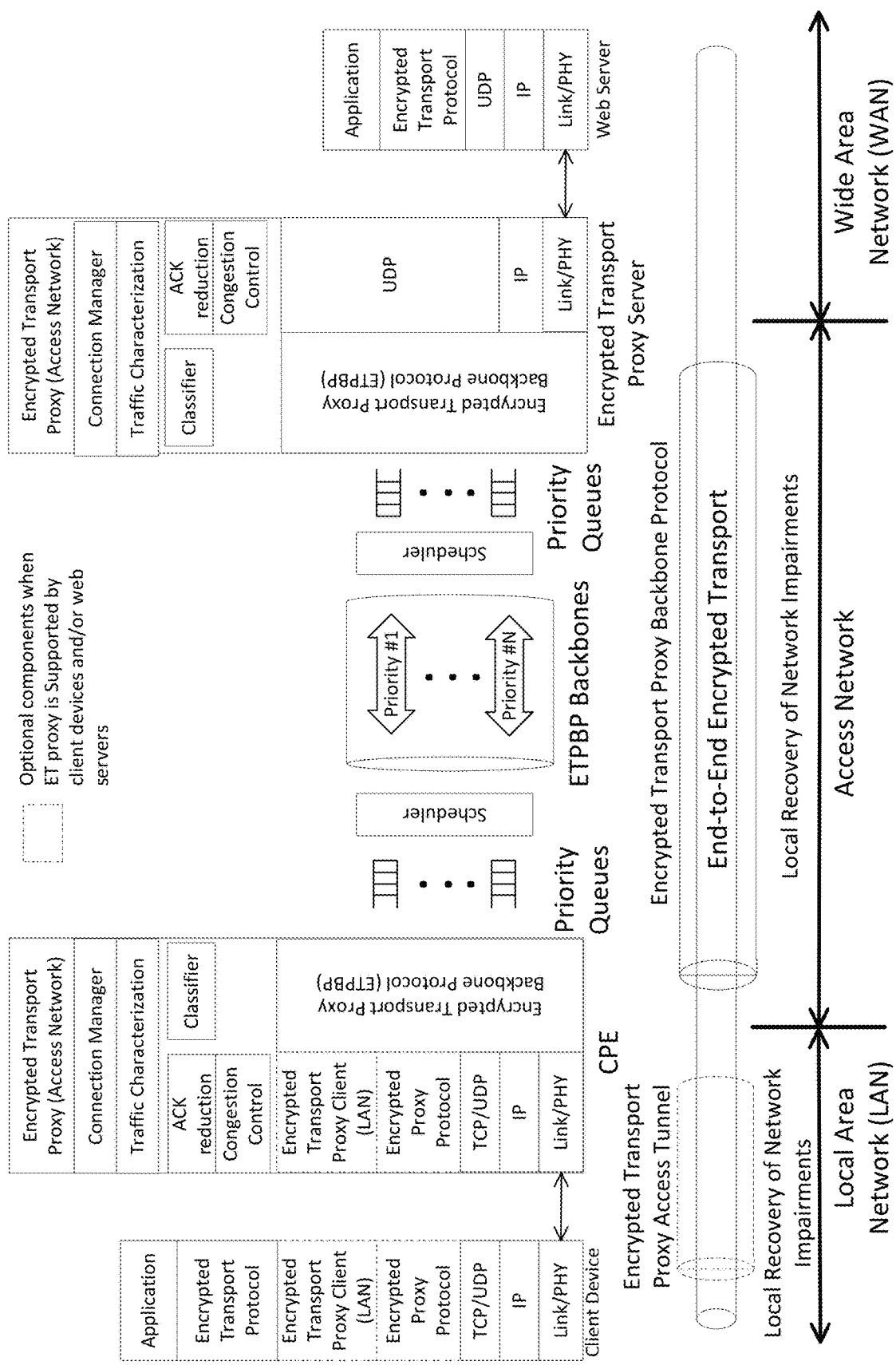
FIG. 18 illustrates functional blocks, system components and protocol stacks of a distributed encrypted transport proxy system with client device's support and without web server's support for encrypted transport proxy (Mode 2).

FIG. 18 shows functional blocks, system components and protocol stacks of the distributed encrypted transport proxy system with client device support and without web server's support for encrypted transport proxy, as shown in FIG. 17. ET proxy client 128 in client device 106 communicates with ET proxy in the CPE 104 using the ET proxy protocol to set up a tunnel 212 and to transfer UDP payloads over the tunnel 212.

In Mode 2, a HTTP tunnel 212 is set up between a client device 106 and a CPE 104, and UDP flows are multiplexed in the tunnel 212 with HTTP/2 and with HTTP/3. Each UDP flow is uniquely identified by a stream ID (See, e.g., Connection Table, FIG. 7). Therefore, an encrypted transport UDP connection is uniquely identified by LAN 4-tuples and LAN stream ID. LAN 4-tuple is the UDP 4-tuple of client device source IP address, client device source port number, web server IP address and port number. Destination IP address and port number in LAN 4-tuple is not that of the tunnel. They are that of a web server. As shown in FIG. 6, in Mode 2, an encrypted transport UDP connection is uniquely identified by LAN 4-tuple and LAN stream ID at the LAN interface of a CPE. LAN stream ID in the connection table in FIG. 7 is the stream ID in the HTTP tunnel of the ET proxy protocol between a client and the CPE. Table lookup key in Mode 2 at the LAN interface of a CPE is LAN 4-tuple and LAN stream ID.

There is a LAN link, such as Wi-Fi or ethernet, between a client device 106 and a CPE 104. Packet loss can be present and significant especially when the client 106 device is in disadvantaged location with respect to the CPE 104 with a built-in Wifi access point. Therefore, it is necessary to have local reliable delivery to recover packet loss without waiting for the end-to-end loss recovery by the client device 106 and the web server 116 especially when the RTT is significant between the client 106 and the web server 116.

Figure 19:
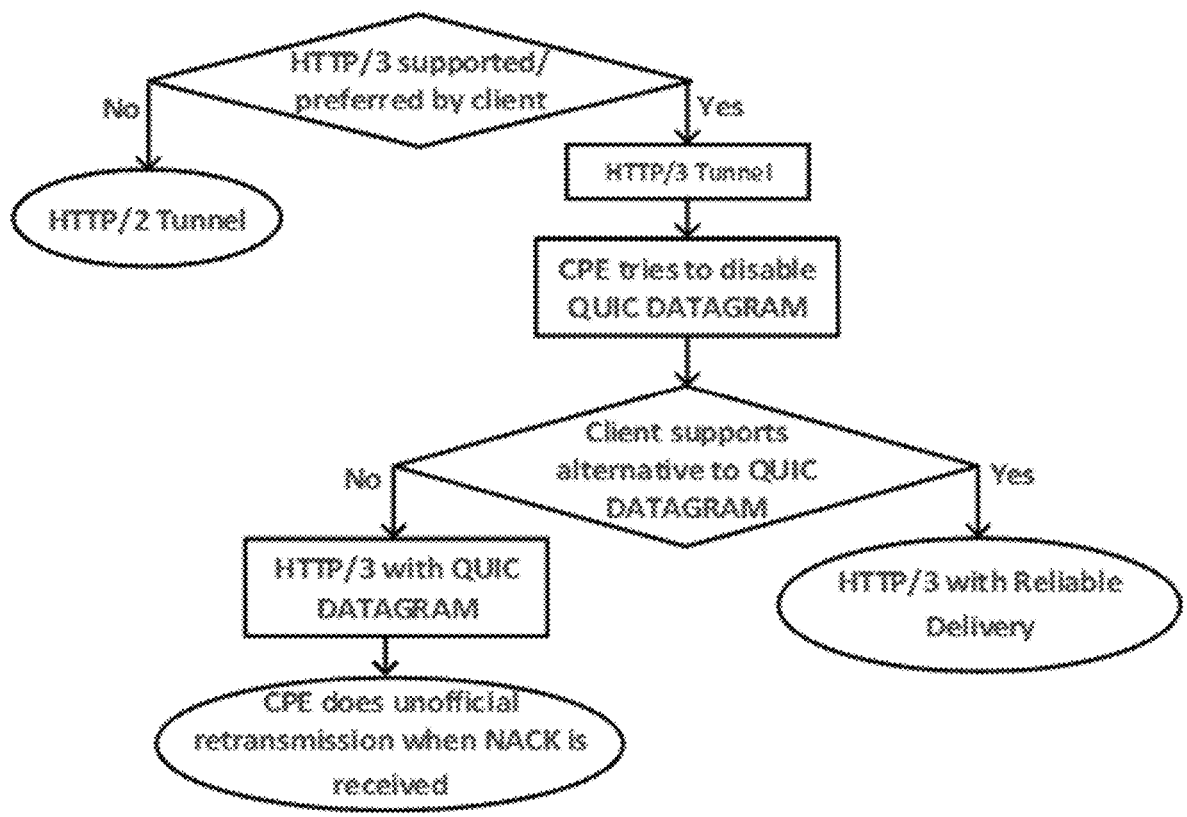
FIG. 19 illustrates a procedure to achieve reliable delivery between ET proxy client at a client and at a ET proxy at a CPE.

FIG. 19 is a flowchart of a method to achieve reliable transport with the IETF standard ET proxy client. First, a determination is made as to whether HTTP/2 or HTTP/3 is supported by the client device (block 1902). If HTTP/3 is not supported, an HTTP/2 tunnel is used (block 1904). If HTTP/3 is supported, an HTTP/3 tunnel is used (block 1606). The CPE then tries to disable encrypted transport protocol DATAGRAM (block 1608), e.g., QUIC DATAGRAM. For example, ET proxy in the CPE sends SETTINGS_H3_DATAGRAM set to zero. A check is then made to determine whether the client supports alternative to QUIC datagram (block 1610). If the ET proxy client in the client's device support the alternative to QUIC DATAGRAM, ET proxy protocol can be operated in HTTP/3 with reliable delivery (lock 1612). Otherwise, HTTP/3 with QUIC Datagram is used (block 1614). The CPE performs unofficial retransmission of QUIC packets when it receives negative acknowledgements (block 1616). It can provide reliable delivery of packet loss in the direction of data flow from the CPE to the client device. Usually, client devices consume more data than they generate.

The classifier module in Mode 2 classifies UDP payloads into QoS classes based on the analysis results from traffic characterization module in the same manner as discussed above for Mode 1. ET proxy protocol can allow ET proxy client at a client device 106 to communicate its prioritization preference to the ET proxy at CPE 104 by using a control message. Since UDP flows are multiplexed in an ET proxy tunnel between a client's device and a CPE, it is desirable to classify UDP packets and prioritize them accordingly. The ET proxy (LAN) in the CPE 106 classifies UDP payloads and prioritizes them based on QoS classification results from the classifier module and prioritization preference expressed by the ET proxy client at a client's device. It schedules and transmit them in the tunnel to the client's device.

Figure 20:
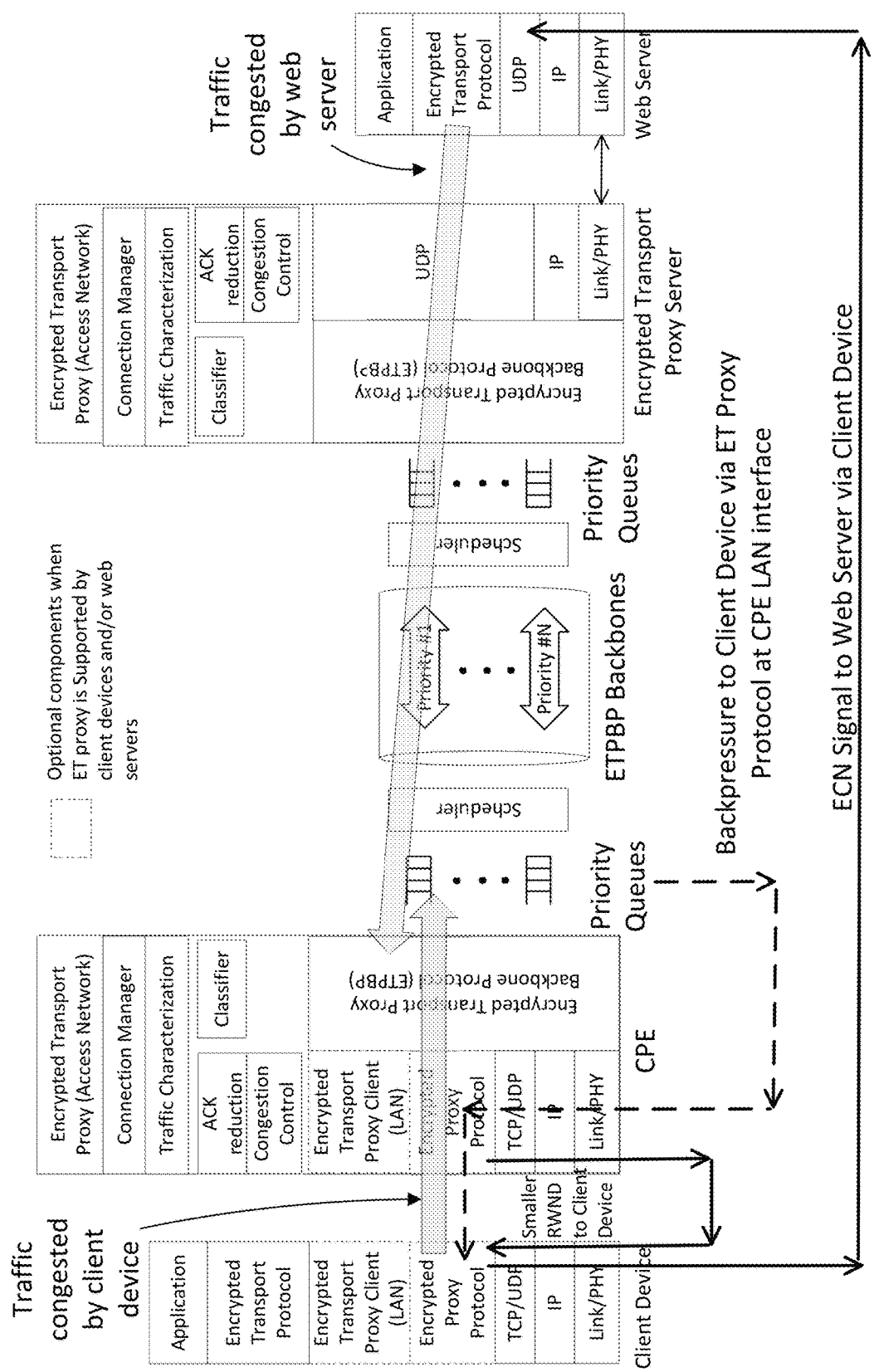
FIG. 20 illustrates use of ECN and backpressure for congestion control of web servers and client devices in Mode 2.

FIG. 20 shows the ECN and backpressure signal for congestion control of web servers 116 and client devices 106 in Mode 2. The priority queues 432 store UDP payloads to transmit to a client device 106 with reliable delivery. The queues 432 can be overwhelmed by the amount of traffic from web servers 116. Both AQM and ECN can be applied to each of the priority queues, as described above for Mode 1.

To express ECN support, ECN-capable communicating end points mark ECN bits in their IP packet header. In case of congestion, the ECN-capable network node marks ECN bits as the congestion indicator in the IP packet header of an IP packets transmitted to a receiver. However, ET proxy tunnel transfers UDP payloads without IP headers, ET proxy protocol can support transfer of ECN bits over the tunnel between a client device 106 and a CPE 104 without the use of ECN bits in the IP packet header. ECN bits are carried as a control message in the ET proxy protocol between a client device 106 and a CPE 104.

ET proxy (LAN) performs congestion control using ECN as follows. When ECN-capable bits in a control message are received from a client device, set ECN bits in the IP packet header accordingly of the IP packets transmitted to a web server. When ECN-capable bits in the IP packet header of IP packets are received from a web server, send ECN control message with ECN bits from the web server to the client's device. When priority queues with UDP payloads to be transmitted to a client's device is congested, send ECN control message with ECN bits representing congestion indicator to the client device. When a CPE receives ECN-capable bits in the IP packet header of IP packets received from ETPBP backbones, send ECN control message with ECN bits copied from the IP packet header to the client device.

Priority queues of ETPBP backbones at the CPE buffer UDP payloads from client devices to be transported over the ETPBP backbones to web servers as shown in FIG. 20. When the queues are overwhelmed by the traffic from client devices, ETPBP at the CPE 104 sends a "backpressure" signal to ET proxy protocol 128 at the LAN interface of the CPE 104. ET proxy protocol at the LAN interface slow down the transmission rate of a client device 106, for example, by reducing the receive window size in its advertisement to a client device 106.

Mode 2 can operate without Mode 1 function. In other words, an ET proxy access tunnel may be implemented between a client device 106 and a CPE 104 without providing an ET proxy backbone 210 between the CPE 104 and the ET proxy server 124. Mode 2 without Mode 1 function performs local recovery of WLAN (Wi-Fi) network impairments, congestion control to prevent end devices from causing network congestion, and prioritized transport between the client device and the satellite terminal (CPE). Since there can be significant packet loss and low data rate in WLAN especially when a user's device is in a disadvantaged location, it is still beneficial to operate Mode 2 without Mode 1 function.

Figure 21:
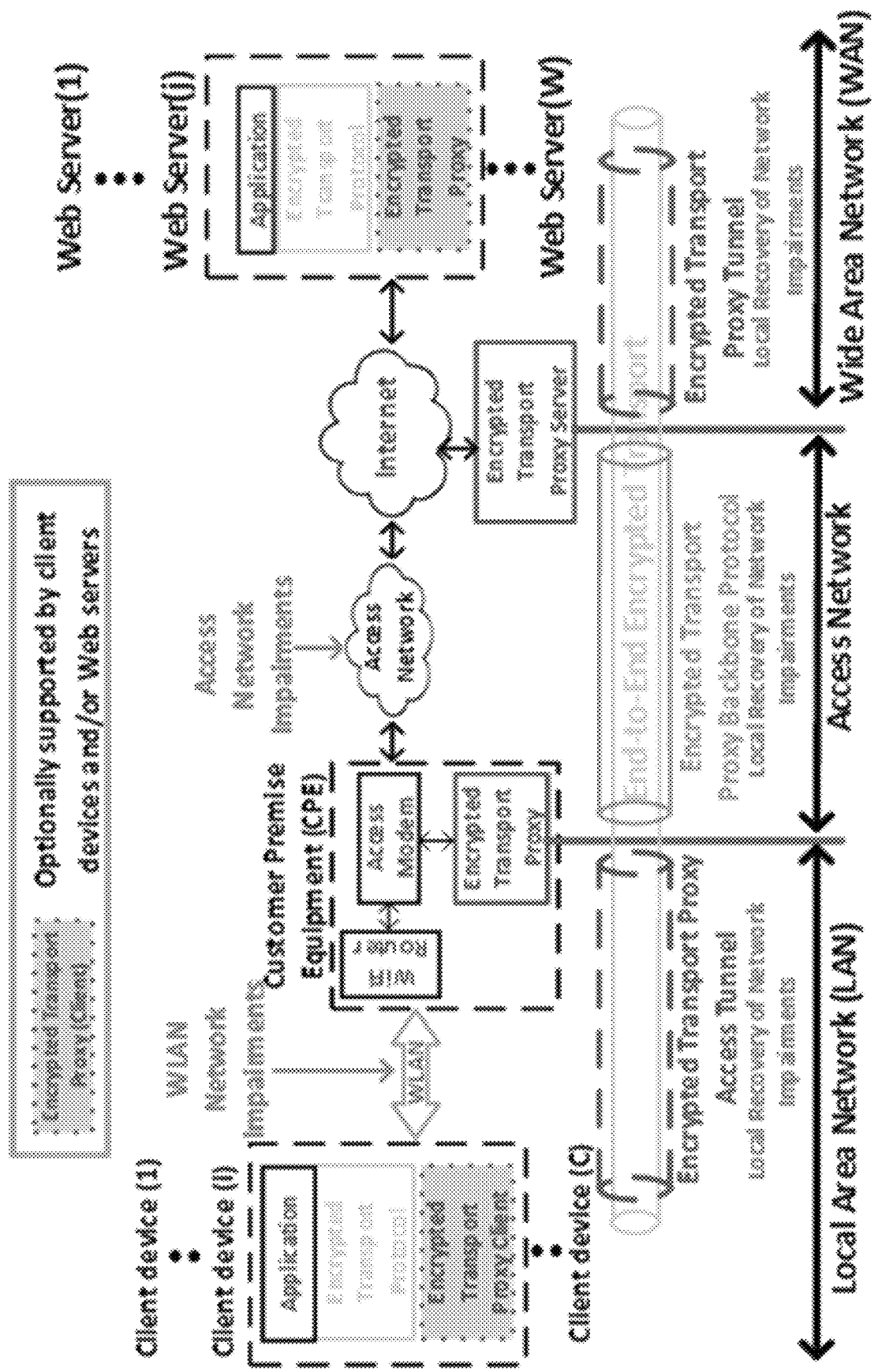
FIG. 21 illustrates distributed encrypted transport proxy system in a broadband internet service system (Mode 3).

Mode 3: ETPBP Between a CPE and the ET Proxy Server with Client Device's and Web Server's Support for ET Proxy Mode 3 of the ET proxy protocol will now be described with regard to FIG. 21. FIG. 21 shows a distributed proxy system 2100 with ET proxy support from the client device and with ET proxy support from web server 116. In this mode, a client device 106 is installed with ET proxy client software. The user may be given the option to use ET proxy and a web server supports ET proxy and the ET proxy server 124 connects the web server with an ET proxy tunnel. Web servers 116 are provided with ET proxy software 130 for supporting the ET proxy protocol. There is an ET proxy access tunnel 212 between a client device 106 and a CPE 104, and an ET proxy access tunnel 214 between the ET proxy server 124 and the ET proxy 130 in web server 116. In this mode, a client device 106 is installed with ET proxy client software 128 and the user chooses to use the ET proxy as in Mode 2.

Referring to FIG. 21, an application 2102 in a client device 106 communicates with the application 2104 in a web server 116 over an end-to-end encrypted transport protocol 208 between the client device 106 and the web server 116. The ET proxy client 128 in the client device 106 and the ET proxy 126 in the CPE 104 operate in the same way as described above for Mode 2. The ET proxy server 124 receives ET packets from ETPBP backbones 210 and sends UDP payloads to ET proxy 130 in the web server 116 over ET proxy tunnel 214. The ET proxy 130 in the web server 130 receives UDP payloads from the ET proxy server 124 and transfers them to the ET protocol and back to the application 2104. When sending packets, the ET proxy 130 in the web server 116 sends UDP payloads from ET proxy 130 to the ET proxy server 124 over the ET proxy tunnel 214. The ET proxy server 124 receives UDP payloads from the web server 116 through the ET proxy tunnel 214 and send them over ETPBP backbones 210 to the CPE 104.

Figure 22:
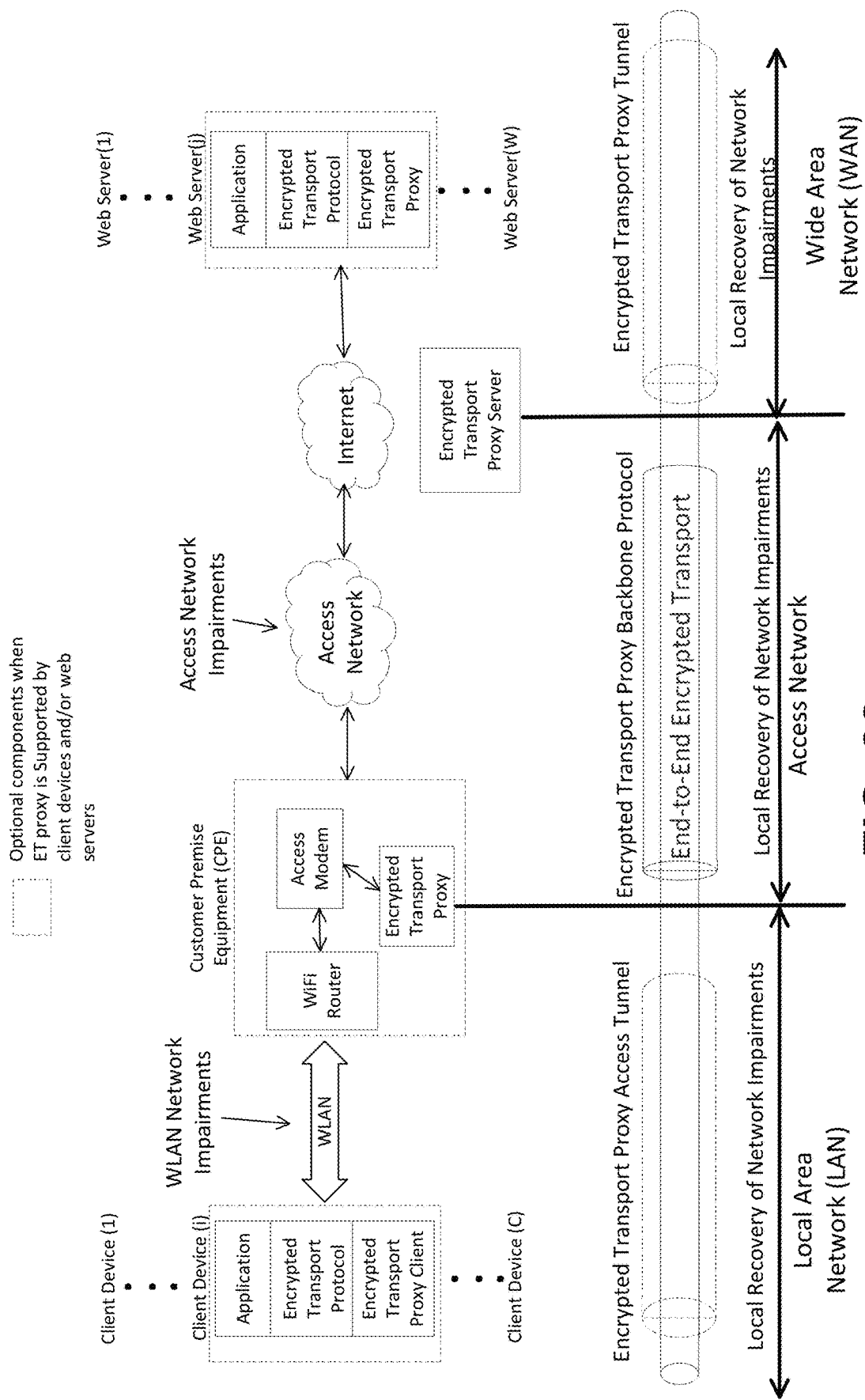
FIG. 22 illustrates functional blocks, system components and protocol stacks of a distributed encrypted transport proxy system (Mode 3).

FIG. 22 shows functional blocks, system components and protocol stacks of a distributed encrypted transport proxy system with client device's support and with web server's support for encrypted transport proxy. ET proxy client (WAN) 2202 in the ET proxy server 124 communicates with ET proxy (WAN) 2204 in the web server 116 using the ET proxy protocol 130 to set up a tunnel 214 and to transfer UDP payloads over the tunnel 214. Mode 3 enables connection management to carry UDP payload from ET proxy protocol over ET PBP backbones, reliable delivery of packets between the ET proxy server and the ET proxy (WAN) at the web server, classification and prioritization of packets, congestion control to prevent a client's device and a web server from causing network congestion in access network.

In Mode 3, a HTTP tunnel 214 is set up between the ET proxy server 124 and a web server 116 and UDP flows are multiplexed in the tunnel for the tunnel with HTTP/2 and with HTTP/3. Each UDP flow is uniquely identified by a stream ID. Therefore, an encrypted transport UDP connection is uniquely identified by WAN 4-tuples and WAN stream ID.

WAN 4-tuple is the UDP 4-tuple of the proxy server source IP address and source port number and web server IP address and port number. As shown in FIG. 6, in Mode 3, an encrypted transport UDP connection is uniquely identified by WAN 4-tuple and WAN stream ID at the WAN interface of a ET proxy server. WAN stream ID in the connection table in FIG. 7 is the stream ID in the HTTP tunnel of the ET proxy protocol between the ET proxy server and a web server. Table lookup key in Mode 3 at the WAN interface of the ET proxy server is WAN 4-tuple and WAN stream ID.

Figure 23:
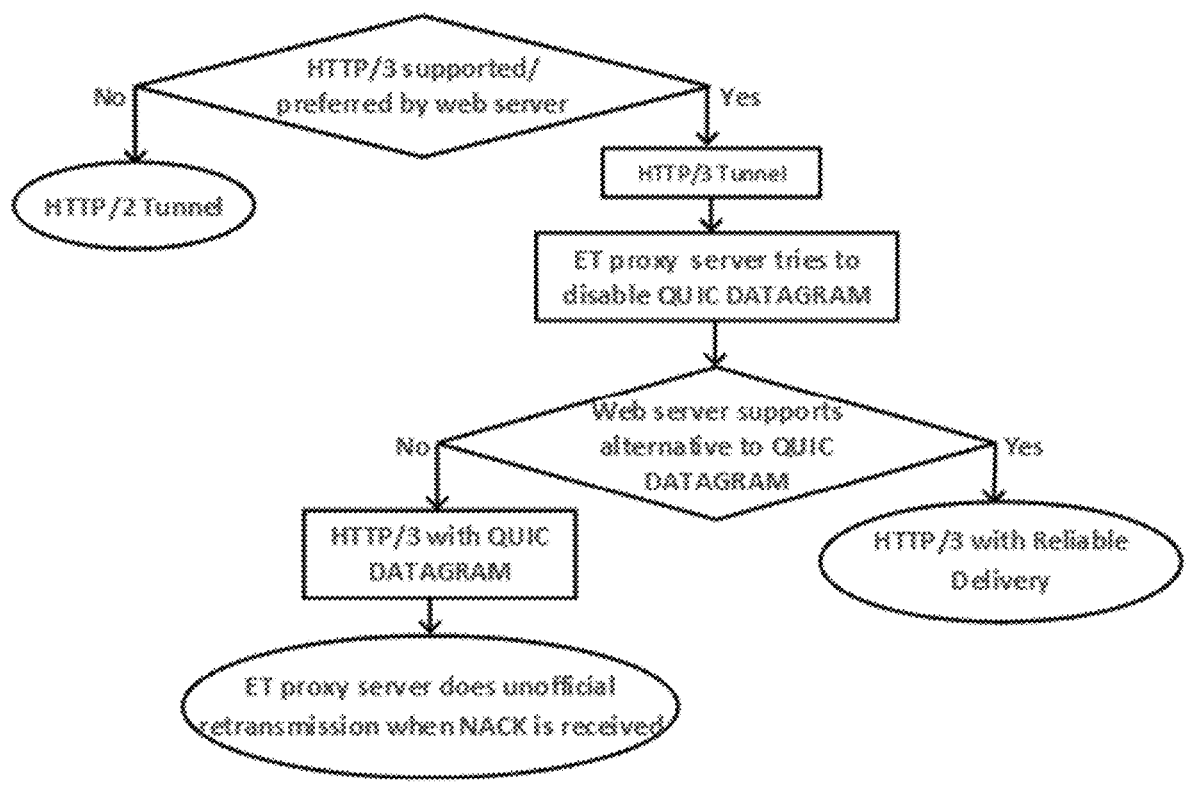
FIG. 23 illustrates a procedure to achieve reliable delivery between ET proxy client at ET proxy server and at a ET proxy at a web server.

FIG. 23 is a flowchart of a method to achieve reliable transport with the IETF standard ET proxy. First, a determination is made as to whether HTTP/2 or HTTP/3 is supported by the web server (block 2302). If HTTP/3 is not supported, an HTTP/2 tunnel is used (block 2304). If HTTP/3 is supported, an HTTP/3 tunnel is used (block 2306). The ET proxy client then tries to disable encrypted transport protocol DATAGRAM (block 2308), e.g., QUIC DATAGRAM. For example, ET proxy client in the ET proxy server sends SETTINGS_H3_DATAGRAM set to zero. A check is then made to determine whether ET proxy in the web server supports alternative to QUIC datagram (block 2310). If the ET proxy in the web server support the alternative to QUIC DATAGRAM, ET proxy protocol can be operated in HTTP/3 with reliable delivery (lock 2312). Otherwise, HTTP/3 with QUIC DATAGRAM is used (block 2314). The ET proxy server performs unofficial retransmission of QUIC packets when it receives negative acknowledgements (block 2316). It can provide reliable delivery of packet loss in the direction of data flow from the ET proxy server to the web server.

The classifier module in Mode 3 classifies UDP payloads into QoS classes based on the analysis results from traffic characterization module in the same manner as discussed above for Mode 1. Since UDP flows are multiplexed in an ET proxy tunnel between the ET proxy server and a web server, it is desirable to classify UDP packets and prioritize them accordingly. The ET proxy (WAN) in the ET proxy server classifies UDP payloads and prioritizes them based on QoS classification results from the classifier. It schedules and transmit them in the tunnel to the web server. ET proxy protocol can allow ET proxy client at the ET proxy server communicate its prioritization preference to the ET proxy at a web server by using a control message. The web server can prioritize UDP payloads based on prioritization preference expressed by the ET proxy client at the ET proxy server.

Figure 24:
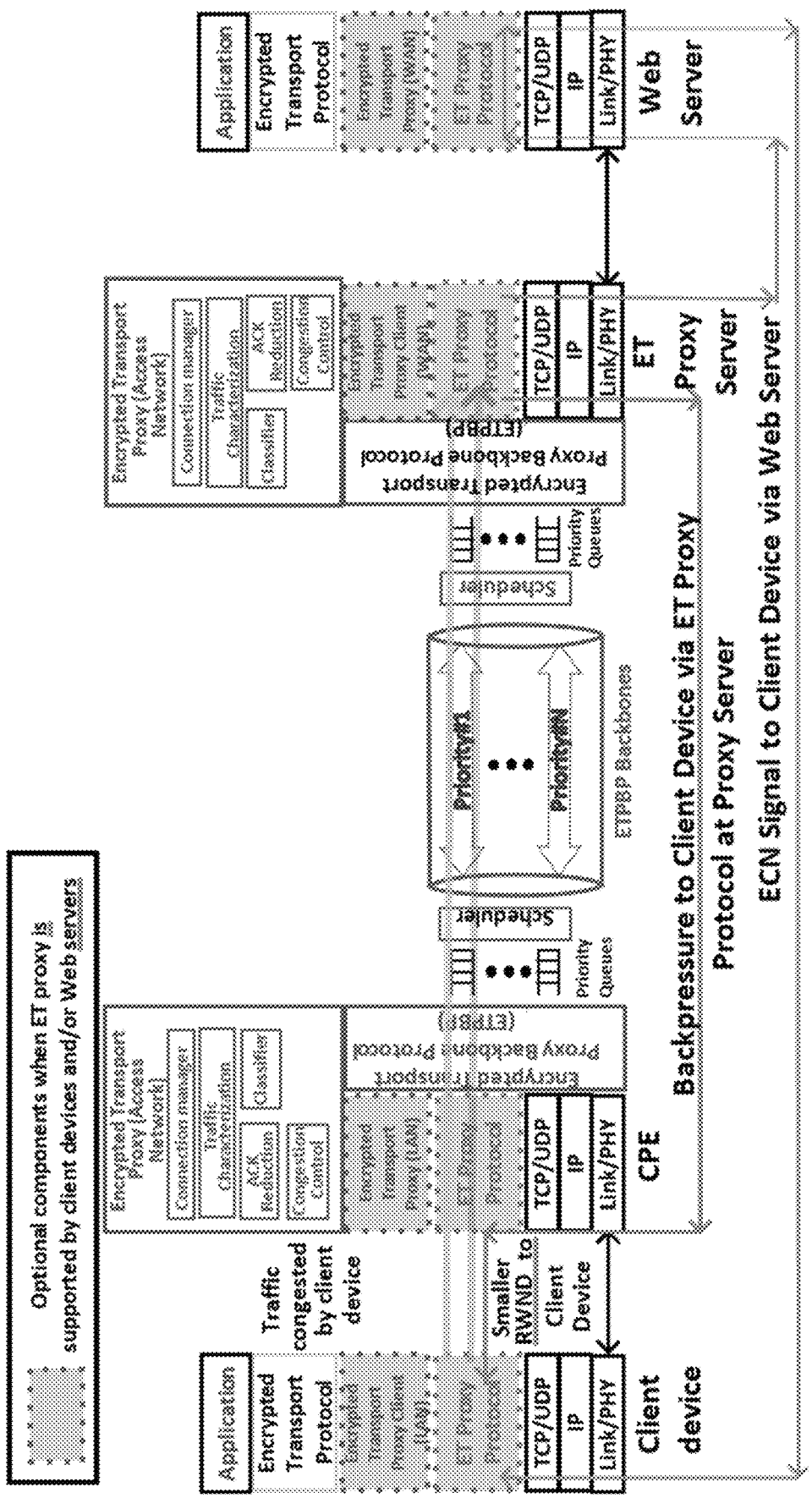
FIG. 24 illustrates use of ECN and backpressure for congestion control of client devices in Mode 3.
Figure 25:
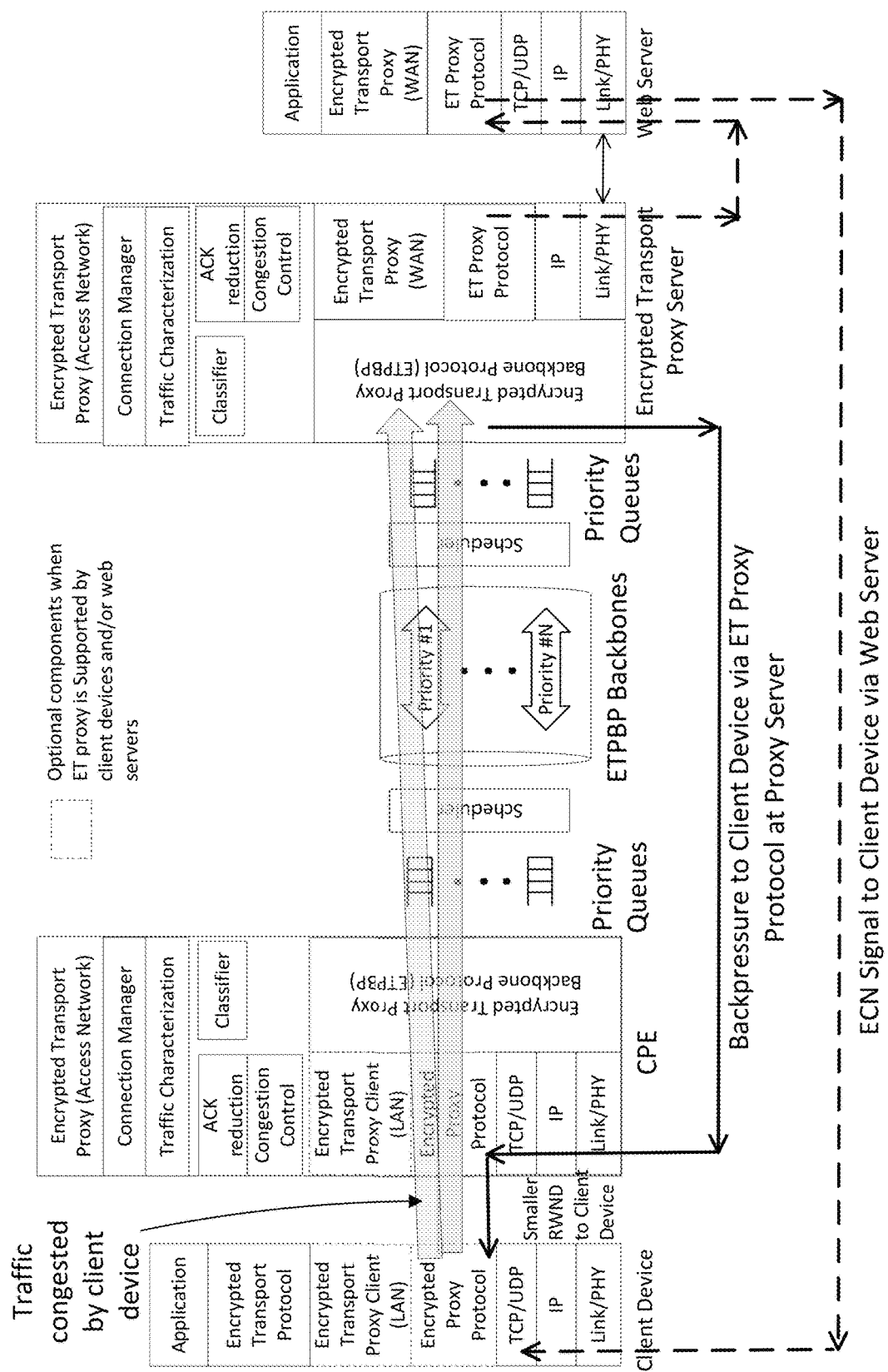
FIG. 25 illustrates use of backpressure for congestion control of web servers in Mode 3.

FIG. 24 shows use of ECN and backpressure for congestion control of client devices 106 in Mode 3. FIG. 25 shows use of backpressure for congestion control of web servers 116 in Mode 3. The priority queues stores UDP payloads to transmit to a web server with reliable delivery. The queues can be overwhelmed by the amount of traffic from CPEs. Both AQM and ECN can be applied to each of the priority queues similar to the Mode 1.

ET proxy (WAN) performs congestion control using ECN as follows. When ECN-capable bits in a control message are received from a web server, set ECN bits in the IP packet header accordingly of the IP packets transmitted to a client device. When ECN-capable bits in the IP packet header of IP packets are received from a client device, send ECN control message with ECN bits from the client device to the web server. When priority queues with UDP payloads to be transmitted to a web server are congested, send ECN control message with ECN bits representing congestion indicator to the web server. When the ET proxy server receives ECN-capable bits in the IP packet header of IP packets received from ETPBP backbones, send ECN control message with ECN bits copied from the IP packet header to the web server Similar to Mode 2, the priority queues at the WAN interface of the ET proxy server can be congested by the traffic from client devices. When it occurs, the ET proxy protocol at the ET proxy server sends a "backpressure" signal to the ET proxy protocol at the LAN interface of a CPE. ET proxy protocol at the LAN interface slow down the transmission rate of a client's device, for example, by reducing the receive window size in its advertisement to a client's device.

A number of queues/buffers can be congested by the traffic from web servers. As one example, priority queues of ETPBP backbones at the ET proxy server buffer UDP payloads from web servers to be transported over the ETPBP backbones to client's devices. When the queues are overwhelmed by the traffic from web servers, ETPBP at the ET proxy server sends a "backpressure" signal to ET proxy protocol at the WAN interface of the ET proxy server. ET proxy protocol at the WAN interface slow down the transmission rate of a web server, for example, by reducing the receive window size in its advertisement to the web server. As another example, the priority queues at the LAN interface of a CPE can be congested by the traffic from web servers to be transmitted client's devices. When the queues are overwhelmed by the traffic from web servers, ET proxy protocol at the LAN interface of the CPE sends a "backpressure" signal to ET proxy protocol at the WAN interface of the ET proxy server. ET proxy protocol at the WAN interface can slow down the transmission rate of a web server, for example, by reducing the receive window size in its advertisement to the web server.

Figure 26:
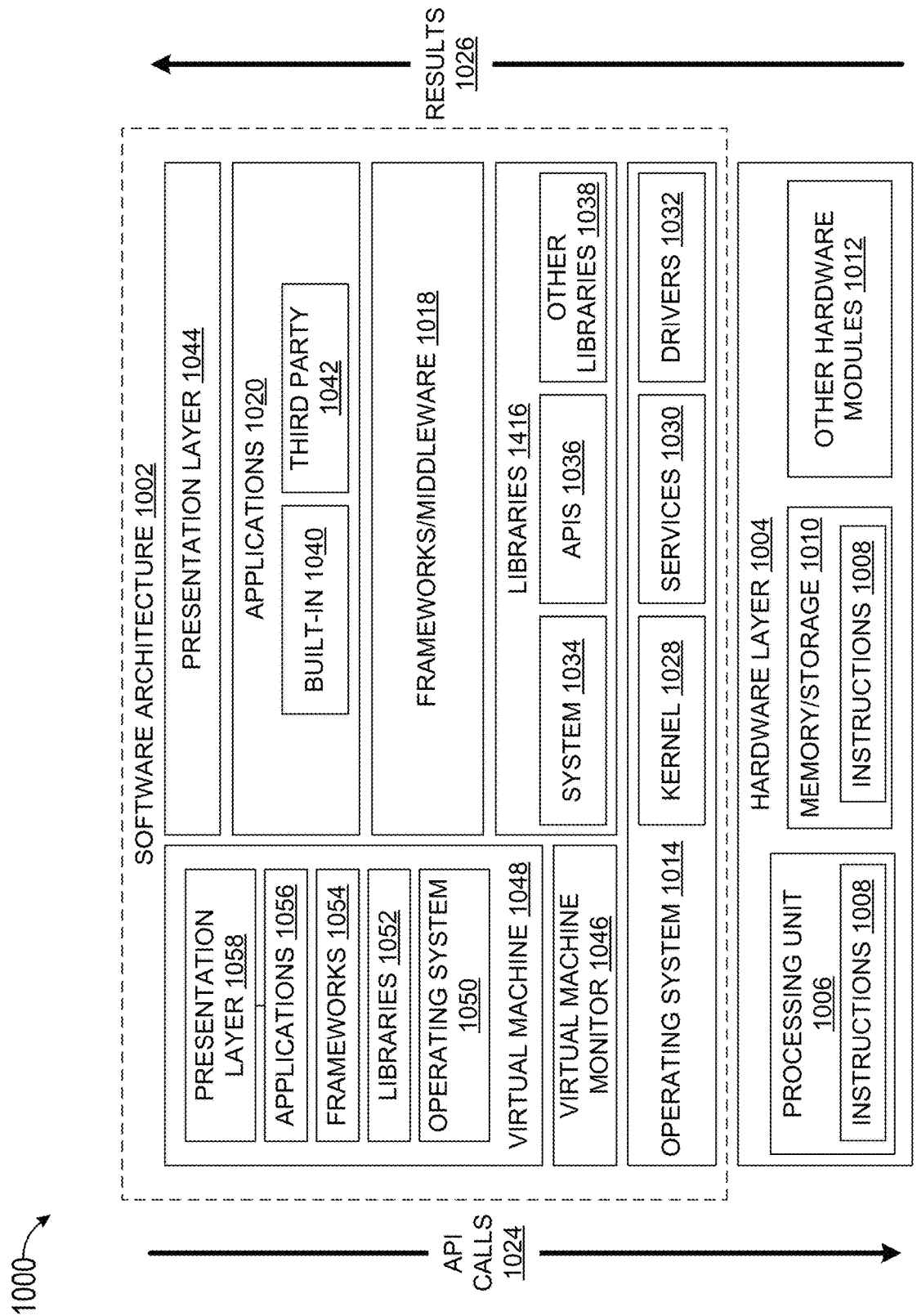
FIG. 26 is a block diagram showing an example software architecture, various portions of which may be used in conjunction with various hardware architectures herein described, which may implement any of the features described herein.

FIG. 26 is a block diagram 2600 illustrating an example software architecture 2602, various portions of which may be used in conjunction with various hardware architectures herein described, which may implement any of the above-described features. FIG. 26 is a non-limiting example of a software architecture and it will be appreciated that many other architectures may be implemented to facilitate the functionality described herein. The software architecture 2602 may execute on hardware such as a machine 2700 of FIG. 27 that includes, among other things, processors 2710, memory 2730, and input/output (I/O) components 2750. A representative hardware layer 2604 is illustrated and can represent, for example, the machine 2700 of FIG. 27. The representative hardware layer 2604 includes a processing unit 2606 and associated executable instructions 2608. The executable instructions 2608 represent executable instructions of the software architecture 2602, including implementation of the methods, modules and so forth described herein. The hardware layer 2604 also includes a memory/storage 2610, which also includes the executable instructions 2608 and accompanying data. The hardware layer 2604 may also include other hardware modules 2612. Instructions 2608 held by processing unit 2606 may be portions of instructions 22608 held by the memory/storage 2610.

The example software architecture 2602 may be conceptualized as layers, each providing various functionality. For example, the software architecture 2602 may include layers and components such as an operating system (OS) 2614, libraries 2616, frameworks/middleware 2618, applications 2620, and a presentation layer 2644. Operationally, the applications 2620 and/or other components within the layers may invoke API calls 2624 to other layers and receive corresponding results 2626. The layers illustrated are representative in nature and other software architectures may include additional or different layers. For example, some mobile or special purpose operating systems may not provide the frameworks/middleware 1018.

The OS 2614 may manage hardware resources and provide common services. The OS 1014 may include, for example, a kernel 2628, services 2630, and drivers 2632. The kernel 2628 may act as an abstraction layer between the hardware layer 1004 and other software layers. For example, the kernel 2628 may be responsible for memory management, processor management (for example, scheduling), component management, networking, security settings, and so on. The services 2630 may provide other common services for the other software layers. The drivers 2632 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 2616 may provide a common infrastructure that may be used by the applications 2620 and/or other components and/or layers. The libraries 2616 typically provide functionality for use by other software modules to perform tasks, rather than rather than interacting directly with the OS 2614. The libraries 2616 may include system libraries 2634 (for example, C standard library) that may provide functions such as memory allocation, string manipulation, file operations. In addition, the libraries 2616 may include API libraries 2636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 2616 may also include a wide variety of other libraries 2638 to provide many functions for applications 2620 and other software modules.

The frameworks 2618 (also sometimes referred to as middleware) provide a higher-level common infrastructure that may be used by the applications 2620 and/or other software modules. For example, the frameworks 2618 may provide various graphic user interface (GUI) functions, high-level resource management, or high-level location services. The frameworks 2618 may provide a broad spectrum of other APIs for applications 2620 and/or other software modules.

The applications 2620 include built-in applications 2640 and/or third-party applications 2642. Examples of built-in applications 2620 may include, but are not limited to, a contacts application, a browser application, a location application, a media application, a messaging application, and/or a game application. Third-party applications 2642 may include any applications developed by an entity other than the vendor of the particular platform. The applications 2620 may use functions available via OS 2614, libraries 2616, frameworks 2618, and presentation layer 2644 to create user interfaces to interact with users.

Some software architectures use virtual machines, as illustrated by a virtual machine 2648. The virtual machine 2648 provides an execution environment where applications/modules can execute as if they were executing on a hardware machine (such as the machine 2700 of FIG. 27, for example). The virtual machine 2648 may be hosted by a host OS (for example, OS 2614) or hypervisor, and may have a virtual machine monitor 2646 which manages operation of the virtual machine 2648 and interoperation with the host operating system. A software architecture, which may be different from software architecture 2602 outside of the virtual machine, executes within the virtual machine 2648 such as an OS 2650, libraries 2652, frameworks 2654, applications 2656, and/or a presentation layer 2658.

Figure 27:
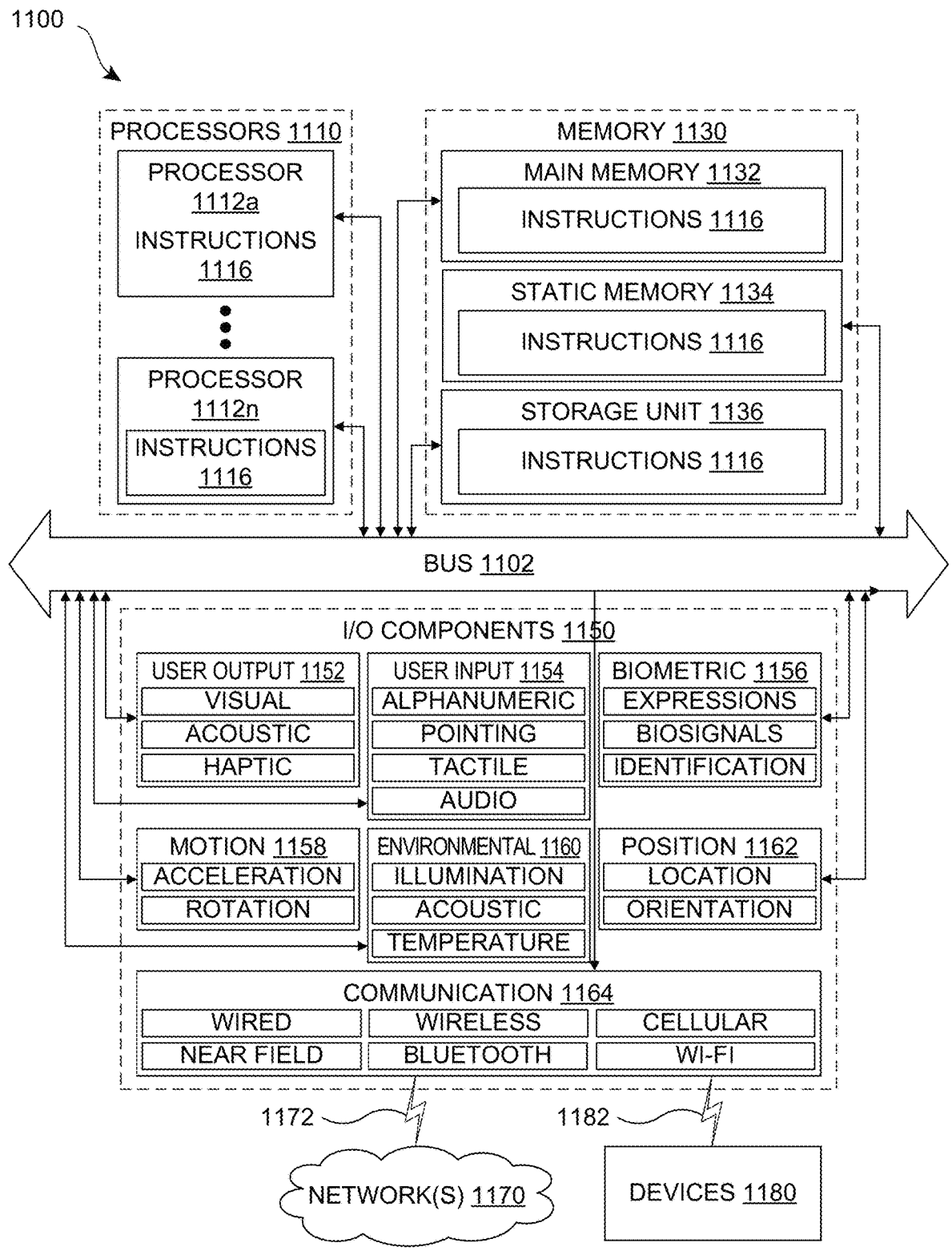
FIG. 27 is a block diagram showing components of an example machine configured to read instructions from a machine-readable medium and perform any of the features described herein.

FIG. 27 is a block diagram illustrating components of an example machine 2700 configured to read instructions from a machine-readable medium (for example, a machine-readable storage medium) and perform any of the features described herein. The example machine 2700 is in a form of a computer system, within which instructions 2716 (for example, in the form of software components) for causing the machine 2700 to perform any of the features described herein may be executed. As such, the instructions 2716 may be used to implement modules or components described herein. The instructions 2716 cause unprogrammed and/or unconfigured machine 2700 to operate as a particular machine configured to carry out the described features. The machine 2700 may be configured to operate as a standalone device or may be coupled (for example, networked) to other machines. In a networked deployment, the machine 2700 may operate in the capacity of a server machine or a client machine in a server-client network environment, or as a node in a peer-to-peer or distributed network environment. Machine 2700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 2700 is illustrated, the term "machine" includes a collection of machines that individually or jointly execute the instructions 2716.

The machine 2700 may include processors 2710, memory 2730, and I/O components 2750, which may be communicatively coupled via, for example, a bus 2702. The bus 2702 may include multiple buses coupling various elements of machine 2700 via various bus technologies and protocols. In an example, the processors 2710 (including, for example, a central processing unit (CPU), a graphics processing unit (GPU), a digital signal processor (DSP), an ASIC, or a suitable combination thereof) may include one or more processors 2712a to 2712n that may execute the instructions 2716 and process data. In some examples, one or more processors 2710 may execute instructions provided or identified by one or more other processors 2710. The term "processor" includes a multi-core processor including cores that may execute instructions contemporaneously. Although FIG. 27 shows multiple processors, the machine 2700 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 2730 may include a main memory 2732, a static memory 2734, or other memory, and a storage unit 2736, both accessible to the processors 2710 such as via the bus 2702. The storage unit 2736 and memory 2732, 2734 store instructions 2716 embodying any one or more of the functions described herein. The memory/storage 2730 may also store temporary, intermediate, and/or long-term data for processors 2710. The instructions 2716 may also reside, completely or partially, within the memory 2732, 2734, within the storage unit 2736, within at least one of the processors 2710 (for example, within a command buffer or cache memory), within memory at least one of I/O components 2750, or any suitable combination thereof, during execution thereof. Accordingly, the memory 2732, 2734, the storage unit 2736, memory in processors 2710, and memory in I/O components 2750 are examples of machine-readable media.

As used herein, "machine-readable medium" refers to a device able to temporarily or permanently store instructions and data that cause machine 2700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 2716) for execution by a machine such that the instructions, when executed by one or more processors 2710 of the machine 2700, cause the machine 2700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 2750 may include a wide variety of hardware components adapted to receive input, provide output, produce output, transmit information, exchange information, capture measurements, and so on. The specific I/O components 2750 included in a particular machine will depend on the type and/or function of the machine. For example, mobile devices such as mobile phones may include a touch input device, whereas a headless server or IoT device may not include such a touch input device. The particular examples of I/O components illustrated in FIG. 27 are in no way limiting, and other types of components may be included in machine 2700. The grouping of I/O components 2750 are merely for simplifying this discussion, and the grouping is in no way limiting. In various examples, the I/O components 2750 may include user output components 2752 and user input components 2754. User output components 2752 may include, for example, display components for displaying information (for example, a liquid crystal display (LCD) or a projector), acoustic components (for example, speakers), haptic components (for example, a vibratory motor or force-feedback device), and/or other signal generators. User input components 2754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 2750 may include biometric components 2756, motion components 2758, environmental components 2760, and/or position components 2762, among a wide array of other physical sensor components. The biometric components 2756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 2758 may include, for example, acceleration sensors (for example, an accelerometer) and rotation sensors (for example, a gyroscope). The environmental components 2760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 2762 may include, for example, location sensors (for example, a Global Position System (GPS) receiver), altitude sensors (for example, an air pressure sensor from which altitude may be derived), and/or orientation sensors (for example, magnetometers).

The I/O components 2750 may include communication components 2764, implementing a wide variety of technologies operable to couple the machine 2700 to network(s) 2770 and/or device(s) 2780 via respective communicative couplings 2772 and 2782. The communication components 2764 may include one or more network interface components or other suitable devices to interface with the network(s) 2770. The communication components 2764 may include, for example, components adapted to provide wired communication, wireless communication, cellular communication, Near Field Communication (NFC), Bluetooth communication, Wi-Fi, and/or communication via other modalities. The device(s) 2780 may include other machines or various peripheral devices (for example, coupled via USB).

In some examples, the communication components 2764 may detect identifiers or include components adapted to detect identifiers. For example, the communication components 2764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A distributed proxy device for transmitting data packets between client devices and web servers over an access network using an Encrypted Transport (ET) Proxy Backbone Protocol that is independent of an ET protocol in use between a client device and a web server, the distributed proxy device comprising:
an ET Proxy module configured to:
receive incoming ET proxy packets from an ET proxy backbone module and transmit outgoing ET proxy packets to the ET proxy backbone module;
set up an HTTP tunnel with an ET proxy client of the client device for receiving incoming UDP payloads from the client device and transmitting outgoing UDP payloads to the client device via a local area network (LAN);
receive prioritization preferences from the ET proxy client at client devices pertaining to the UDP payloads indicating preferred quality-of-service (QoS) classes for the UDP payloads;
schedule transmission of the outgoing UDP payloads via the HTTP tunnel based on QoS classes of the outgoing UPD payloads;
a connection manager module configured to:
maintain an ET proxy connection table that includes an entry for each established ET Proxy connection between the client device and other end devices, each entry including connection information;
a traffic characterization module configured to passively monitor packet information of the outgoing UDP payloads;
a classifier module configured to:
classify each of the outgoing UDP payloads into one of a plurality of different QoS classes based on the monitored packet information and based on the prioritization preferences received from the ET proxy client at client devices; and
an ACK reduction module configured to reduce a number of UDP payloads to be proxied over the ET Proxy access tunnel network based on the monitored packet information.

Item 2. The distributed proxy device of item 1, wherein the ET Proxy module is configured to determine whether the client device supports HTTP/3,
wherein, when the client device supports HTTP/3, the HTTP tunnel is set up as an HTTP/3 tunnel, and
wherein, when the client device does not support HTTP/3, the HTTP tunnel is set up as an HTTP/2 tunnel.

Item 3. The distributed proxy device of any of items 1-2, wherein, when the client device supports HTTP/3, the ET Proxy module is configured to determine whether the client device is limited to using a QUIC datagram protocol,
wherein, when the client device is limited to using the QUIC datagram protocol, the QUIC datagram protocol is used in the HTTP tunnel and retransmission of QUIC packets is performed when negative acknowledgements are received, and
wherein, when the client device is not limited to the QUIC datagram protocol, reliable delivery protocols are used in the HTTP tunnel.

Item 4. The distributed proxy device of any of items 1-3, wherein congestion control protocols are used to prevent traffic between the client device and the web server from causing congestion in the access network, the congestion control protocols including at least one of Explicit Congestion Notification (ECN) and Active Queue Management (AQM).

Item 5. The distributed proxy device of any of items 1-4, wherein, to implement ECN congestion control, ECN bits from IP packet headers are transmitted in control messages between the client device and the CPE.

Item 6. The distributed proxy device of any of items 1-5, wherein, when traffic on the ET proxy backbone is congested, the ET proxy module is configured to slow a transmission rate of the client device by reducing a receive window size of in its advertisement to the client device in response to receiving a backpressure signal from the ET proxy backbone module.

Item 7. The distributed proxy device of any of items 1-6, wherein each entry of the ET proxy connection table includes a unique identifier based on a source and a destination for the established ET proxy connection and including connection information for a first segment between the client device and the CPE, a second segment between the CPE and an ET proxy server, and a third segment between the ET proxy server and a web server.

Item 8. The distributed proxy device of any of items 1-7, wherein each entry includes at least a LAN stream ID for identifying a LAN connection between the client device and the CPE.

Item 9. The distributed proxy device of any of items 1-8, further comprising:
an ET proxy backbone module configured to:
set up ET Proxy Backbone connections with another distributed proxy device, each ET Proxy Backbone connection including multiple ET Proxy Backbone channels for transmitting ET proxy packets having different QoS classes, each ET Proxy Backbone channel including a separate queue;
schedule transmissions of the ET proxy packets from each respective queue;
multiplex the ET proxy packets from each respective queue via the associated ET Proxy Backbone channel;
perform local recovery of network impairments over the access network and
perform congestion control to prevent packets from client devices and web servers from causing network congestion to the access network.

Item 10. A distributed proxy device for transmitting data packets between client devices and web servers over an access network using an Encrypted Transport (ET) Proxy Backbone Protocol that is independent of an ET protocol in use between a client device and a web server, the distributed proxy device comprising:
an ET Proxy module configured to:
receive incoming ET proxy packets from an ET proxy backbone module and transmit outgoing ET proxy packets to an ET proxy backbone module;
set up an HTTP tunnel with an ET proxy for receiving incoming UDP payloads from the web server and transmitting outgoing UDP payloads to the web server via a wide area network (WAN);
communicate prioritization preferences to the ET proxy at web servers pertaining to the UDP payloads indicating preferred quality-of-service (QoS) classes for the UDP payloads;

schedule transmission of the outgoing UDP payloads via the HTTP tunnel based on QoS classes of the outgoing UPD payloads;

a connection manager module configured to:
maintain an ET proxy connection table that includes an entry for each established ET Proxy connection between the web server and other end devices, each entry including connection information;

a traffic characterization module configured to passively monitor packet information of the outgoing UDP payloads;

a classifier module configured to:
classify each of the outgoing UDP payloads into one of a plurality of different QoS classes based on the monitored packet information; and an ACK reduction module configured to reduce a number of UDP payloads to be proxied over the ET Proxy access tunnel network based on the monitored packet information.

Item 11. The distributed proxy device of item 10, wherein the ET Proxy module is configured to determine whether the web server supports HTTP/3,
wherein, when the web server supports HTTP/3, the HTTP tunnel is set up as an HTTP/3 tunnel, and
wherein, when the web server does not support HTTP/3, the HTTP tunnel is set up as an HTTP/2 tunnel.

Item 12. The distributed proxy device of any of items 10-11, wherein, when the web server supports HTTP/3, the ET Proxy module is configured to determine whether the web server is limited to using a QUIC datagram protocol,
wherein, when the web server is limited to using the QUIC datagram protocol, the QUIC datagram protocol is used in the HTTP tunnel and retransmission of QUIC packets is performed when negative acknowledgements are received, and
wherein, when the web server is not limited to the QUIC datagram protocol, reliable delivery protocols are used in the HTTP tunnel.

Item 13. The distributed proxy device of any of items 10-12, wherein congestion control protocols are used to prevent traffic between the client device and the web server from causing congestion in the access network, the congestion control protocols including at least one of Explicit Congestion Notification (ECN) and Active Queue Management (AQM).

Item 14. The distributed proxy device of any of items 10-13, wherein, to implement ECN congestion control, ECN bits from IP packet headers are transmitted in control messages between the ET proxy server and the web server.

Item 15. The distributed proxy device of any of items 10-14, wherein traffic on the ET proxy backbone is congested, the ET proxy module is configured to slow a transmission rate of the web server by reducing a receive window size of in its advertisement to the web server in response to receiving a backpressure signal from the ET proxy backbone module.

Item 16. The distributed proxy device of any of items 10-15, wherein each entry of the ET proxy connection table includes a unique identifier based on a source and a destination for the established ET proxy connection and including connection information for a first segment between a client device and a CPE, a second segment between the CPE and the ET proxy server, and a third segment between the ET proxy server and the web server.

Item 17. The distributed proxy device of any of items 10-16, wherein each entry includes at least a WAN stream ID for identifying a WAN connection between the web server and the ET proxy server.

Item 18. A distributed proxy device for transmitting data packets between client devices and web servers over an access network using an Encrypted Transport (ET) Proxy Backbone Protocol that is independent of an ET protocol in use between a client device and a web server, the distributed proxy device comprising:
an ET proxy backbone module configured to:
set up ET Proxy Backbone connections with another distributed proxy device, each ET Proxy Backbone connection including multiple ET Proxy Backbone channels for transmitting ET proxy packets having different QoS classes, each ET Proxy Backbone channel including a separate queue;
schedule transmissions of the ET proxy packets from each respective queue;
multiplex the ET proxy packets from each respective queue via the associated ET Proxy Backbone channel;
perform local recovery of network impairments over the access network and
perform congestion control to prevent packets from client devices and web servers from causing network congestion to the access network.

an ET Proxy module configured to:
receive incoming ET proxy packets from the ET proxy backbone module and transmit outgoing ET proxy packets to the ET proxy backbone module;
set up an HTTP tunnel with an ET proxy client of the client device for receiving incoming UDP payloads from the client device and transmitting outgoing UDP payloads to the client device via a local area network (LAN);
receive prioritization preferences from the ET proxy client pertaining to the UDP payloads indicating preferred quality-of-service (QoS) classes for the UDP payloads; and
schedule transmission of the outgoing UDP payloads via the HTTP tunnel based on QoS classes of the outgoing UPD payloads;

a connection manager module configured to:
maintain an ET proxy connection table that includes an entry for each established ET Proxy connection between the client device and other end devices, each entry including connection information;

a traffic characterization module configured to passively monitor packet information of the outgoing UDP payloads;

a classifier module configured to:
classify each of the outgoing UDP payloads into one of a plurality of different QoS classes based on the monitored packet information and based on the prioritization preferences received from the ET proxy client; and an ACK reduction module configured to reduce a number of UDP payloads to be proxied over the ET Proxy access tunnel network based on the monitored packet information.

Item 19. The distributed proxy device of any of items 10-18, wherein the ET Proxy module is configured to determine whether the client device supports HTTP/3,
wherein, when the client device supports HTTP/3, the HTTP tunnel is set up as an HTTP/3 tunnel, and wherein, when the client device does not support HTTP/3, the HTTP tunnel is set up as an HTTP/2 tunnel.

Item 20. The distributed proxy device of any of items 10-19, wherein, when the client device supports HTTP/3, the ET Proxy module is configured to determine whether the client device is limited to using a QUIC datagram protocol, wherein, when the client device is limited to using the QUIC datagram protocol, the QUIC datagram protocol is used in the HTTP tunnel and retransmission of QUIC packets is performed when negative acknowledgements are received, and wherein, when the client device is not limited to the QUIC datagram protocol, reliable delivery protocols are used in the HTTP tunnel.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A distributed proxy device for transmitting data packets between client devices and web servers over an access network using an Encrypted Transport (ET) Proxy Backbone Protocol that is independent of an ET protocol in use between a client device and a web server, the distributed proxy device comprising:
    an ET Proxy module for a customer premises equipment (CPE) configured to:
        receive incoming ET proxy packets from an ET proxy backbone module and transmit outgoing ET proxy packets to the ET proxy backbone module;
        set up an HTTP tunnel with an ET proxy client of the client device for receiving incoming user datagram protocol (UDP) payloads from the client device and transmitting outgoing UDP payloads to the client device via a local area network (LAN);
        receive prioritization preferences from the ET proxy client at client devices pertaining to the UDP payloads indicating preferred quality-of-service (QoS) classes for the UDP payloads;
        schedule transmission of the outgoing UDP payloads via the HTTP tunnel based on QoS classes of the outgoing UPD payloads;
    a connection manager module configured to:
        maintain an ET proxy connection table that includes an entry for each established ET Proxy connection between the client device and other end devices, each entry including connection information;

a traffic characterization module configured to passively monitor packet information of the outgoing UDP payloads;

a classifier module configured to:
classify each of the outgoing UDP payloads into one of a plurality of different QoS classes based on the monitored packet information and based on the prioritization preferences received from the ET proxy client at client devices; and an ACK reduction module configured to reduce a number of UDP payloads to be proxied over the ET Proxy access tunnel network based on the monitored packet information.

2. The distributed proxy device of claim 1, wherein the ET Proxy module is configured to determine whether the client device supports HTTP/3,
wherein, when the client device supports HTTP/3, the HTTP tunnel is set up as an HTTP/3 tunnel, and
wherein, when the client device does not support HTTP/3, the HTTP tunnel is set up as an HTTP/2 tunnel.

3. The distributed proxy device of claim 2, wherein, when the client device supports HTTP/3, the ET Proxy module is configured to determine whether the client device is limited to using a QUIC datagram protocol,
wherein, when the client device is limited to using the QUIC datagram protocol, the QUIC datagram protocol is used in the HTTP tunnel and retransmission of QUIC packets is performed when negative acknowledgements are received, and
wherein, when the client device is not limited to the QUIC datagram protocol, reliable delivery protocols are used in the HTTP tunnel.

4. The distributed proxy device of claim 3, wherein congestion control protocols are used to prevent traffic between the client device and the web server from causing congestion in the access network, the congestion control protocols including at least one of Explicit Congestion Notification (ECN) and Active Queue Management (AQM).

5. The distributed proxy device of claim 4, wherein, to implement ECN congestion control, ECN bits from IP packet headers are transmitted in control messages between the client device and the CPE.

6. The distributed proxy device of claim 4, wherein, when traffic on the ET proxy backbone is congested, the ET proxy module is configured to slow a transmission rate of the client device by reducing a receive window size of in its advertisement to the client device in response to receiving a backpressure signal from the ET proxy backbone module.

7. The distributed proxy device of claim 1, wherein each entry of the ET proxy connection table includes a unique identifier based on a source and a destination for the established ET proxy connection and including connection information for a first segment between the client device and the CPE, a second segment between the CPE and an ET proxy server, and a third segment between the ET proxy server and a web server.

8. The distributed proxy device of claim 7, wherein each entry includes at least a LAN stream ID for identifying a LAN connection between the client device and the CPE.

9. The distributed proxy device of claim 1, further comprising:
an ET proxy backbone module configured to:
set up ET Proxy Backbone connections with another distributed proxy device, each ET Proxy Backbone connection including multiple ET Proxy Backbone channels for transmitting ET proxy packets having different QoS classes, each ET Proxy Backbone channel including a separate queue;
schedule transmissions of the ET proxy packets from each respective queue;
multiplex the ET proxy packets from each respective queue via the associated ET Proxy Backbone channel;
perform local recovery of network impairments over the access network and
perform congestion control to prevent packets from client devices and web servers from causing network congestion to the access network.

10. A distributed proxy device for transmitting data packets between client devices and web servers over an access network using an Encrypted Transport (ET) Proxy Backbone Protocol that is independent of an ET protocol in use between a client device and a web server, the distributed proxy device comprising:
an ET Proxy module configured to:
receive incoming ET proxy packets from an ET proxy backbone module and transmit outgoing ET proxy packets to the ET proxy backbone module;
set up an HTTP tunnel with an ET proxy for receiving incoming user datagram protocol (UDP) payloads from the web server and transmitting outgoing UDP payloads to the web server via a wide area network (WAN);
communicate prioritization preferences to the ET proxy at web servers pertaining to the UDP payloads indicating preferred quality-of-service (QoS) classes for the UDP payloads;
schedule transmission of the outgoing UDP payloads via the HTTP tunnel based on QoS classes of the outgoing UPD payloads;
a connection manager module configured to:
maintain an ET proxy connection table that includes an entry for each established ET Proxy connection between the web server and other end devices, each entry including connection information;
a traffic characterization module configured to passively monitor packet information of the outgoing UDP payloads;
a classifier module configured to:
classify each of the outgoing UDP payloads into one of a plurality of different QoS classes based on the monitored packet information; and
an ACK reduction module configured to reduce a number of UDP payloads to be proxied over the ET Proxy access tunnel network based on the monitored packet information.

11. The distributed proxy device of claim 10, wherein the ET Proxy module is configured to determine whether the web server supports HTTP/3,
wherein, when the web server supports HTTP/3, the HTTP tunnel is set up as an HTTP/3 tunnel, and
wherein, when the web server does not support HTTP/3, the HTTP tunnel is set up as an HTTP/2 tunnel.

12. The distributed proxy device of claim 11, wherein, when the web server supports HTTP/3, the ET Proxy module is configured to determine whether the web server is limited to using a QUIC datagram protocol,
wherein, when the web server is limited to using the QUIC datagram protocol, the QUIC datagram protocol is used in the HTTP tunnel and retransmission of QUIC packets is performed when negative acknowledgements are received, and wherein, when the web server is not limited to the QUIC datagram protocol, reliable delivery protocols are used in the HTTP tunnel.

13. The distributed proxy device of claim 12, wherein congestion control protocols are used to prevent traffic between the client device and the web server from causing congestion in the access network, the congestion control protocols including at least one of Explicit Congestion Notification (ECN) and Active Queue Management (AQM).

14. The distributed proxy device of claim 13, wherein, to implement ECN congestion control, ECN bits from IP packet headers are transmitted in control messages between the ET proxy server and the web server.

15. The distributed proxy device of claim 14, wherein traffic on the ET proxy backbone is congested, the ET proxy module is configured to slow a transmission rate of the web server by reducing a receive window size of in its advertisement to the web server in response to receiving a backpressure signal from the ET proxy backbone module.

16. The distributed proxy device of claim 10, wherein each entry of the ET proxy connection table includes a unique identifier based on a source and a destination for the established ET proxy connection and including connection information for a first segment between a client device and a customer premises equipment (CPE), a second segment between the CPE and the ET proxy server, and a third segment between the ET proxy server and the web server.

17. The distributed proxy device of claim 16, wherein each entry includes at least a WAN stream ID for identifying a WAN connection between the web server and the ET proxy server.

18. A distributed proxy device for transmitting data packets between client devices and web servers over an access network using an Encrypted Transport (ET) Proxy Backbone Protocol that is independent of an ET protocol in use between a client device and a web server, the distributed proxy device comprising:
an ET proxy backbone module configured to:
set up ET Proxy Backbone connections with another distributed proxy device, each ET Proxy Backbone connection including multiple ET Proxy Backbone channels for transmitting ET proxy packets having different QoS classes, each ET Proxy Backbone channel including a separate queue;
schedule transmissions of the ET proxy packets from each respective queue;
multiplex the ET proxy packets from each respective queue via the associated ET Proxy Backbone channel;
perform local recovery of network impairments over the access network and
perform congestion control to prevent packets from client devices and web servers from causing network congestion to the access network;

an ET Proxy module configured to:
receive incoming ET proxy packets from the ET proxy backbone module and transmit outgoing ET proxy packets to the ET proxy backbone module;
set up an HTTP tunnel with an ET proxy client of the client device for receiving incoming UDP payloads from the client device and transmitting outgoing UDP payloads to the client device via a local area network (LAN);
receive prioritization preferences from the ET proxy client pertaining to the UDP payloads indicating preferred quality-of-service (QoS) classes for the UDP payloads; and
schedule transmission of the outgoing UDP payloads via the HTTP tunnel based on QoS classes of the outgoing UPD payloads;
a connection manager module configured to:
maintain an ET proxy connection table that includes an entry for each established ET Proxy connection between the client device and other end devices, each entry including connection information;
a traffic characterization module configured to passively monitor packet information of the outgoing UDP payloads;
a classifier module configured to:
classify each of the outgoing UDP payloads into one of a plurality of different QoS classes based on the monitored packet information and based on the prioritization preferences received from the ET proxy client; and
an ACK reduction module configured to reduce a number of UDP payloads to be proxied over the ET Proxy access tunnel network based on the monitored packet information.

19. The distributed proxy device of claim 18, wherein the ET Proxy module is configured to determine whether the client device supports HTTP/3,
wherein, when the client device supports HTTP/3, the HTTP tunnel is set up as an HTTP/3 tunnel, and
wherein, when the client device does not support HTTP/3, the HTTP tunnel is set up as an HTTP/2 tunnel.

20. The distributed proxy device of claim 18, wherein, when the client device supports HTTP/3, the ET Proxy module is configured to determine whether the client device is limited to using a QUIC datagram protocol,
wherein, when the client device is limited to using the QUIC datagram protocol, the QUIC datagram protocol is used in the HTTP tunnel and retransmission of QUIC packets is performed when negative acknowledgements are received, and
wherein, when the client device is not limited to the QUIC datagram protocol, reliable delivery protocols are used in the HTTP tunnel.

* * * * *